(12) United States Patent
Dorscheid et al.

(10) Patent No.: US 10,955,240 B2
(45) Date of Patent: Mar. 23, 2021

(54) LENGTH ADJUSTABLE LEVEL

(71) Applicant: Milwaukee Electric Tool Corporation, Brookfield, WI (US)

(72) Inventors: Andrew Kenneth Dorscheid, Waunakee, WI (US); Michael John Caelwaerts, Milwaukee, WI (US); Samuel A. Gould, West Allis, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 197 days.

(21) Appl. No.: 16/293,356

(22) Filed: Mar. 5, 2019

(65) Prior Publication Data
US 2019/0265032 A1 Aug. 29, 2019

Related U.S. Application Data

(63) Continuation of application No. PCT/US2019/019587, filed on Feb. 26, 2019.

(60) Provisional application No. 62/635,922, filed on Feb. 27, 2019.

(51) Int. Cl.
*G01C 9/28* (2006.01)
*G01C 9/34* (2006.01)

(52) U.S. Cl.
CPC ........ *G01C 9/28* (2013.01); *G01C 9/34* (2013.01)

(58) Field of Classification Search
CPC .................................. G01C 9/28; G01C 9/34
USPC ............................................................ 33/383
See application file for complete search history.

(56) References Cited

U.S. PATENT DOCUMENTS

| | | | |
|---|---|---|---|
| 684,846 A | 10/1901 | Moss |
| 717,193 A | 12/1902 | Garabed |
| 887,256 A | 5/1908 | Zeiss |
| 921,773 A | 5/1909 | Zeiss |
| 1,032,379 A | 7/1912 | Henry |
| 1,137,169 A | 4/1915 | Dorison |
| 1,413,056 A | 4/1922 | Parrish et al. |
| 1,789,344 A | 1/1931 | Simon |
| 2,145,988 A | 2/1939 | Meder |
| 2,270,227 A | 1/1942 | Swanson |
| 2,419,451 A | 4/1947 | Keller |

(Continued)

FOREIGN PATENT DOCUMENTS

| | | |
|---|---|---|
| CN | 201964885 | 9/2011 |
| CN | 302841208 | 6/2014 |

(Continued)

OTHER PUBLICATIONS

International Search Report and Written Opinion for International Application No. PCT/US2019/019587, dated Jun. 12, 2019, 12 pages.

*Primary Examiner* — George B Bennett
(74) *Attorney, Agent, or Firm* — Reinhart Boerner Van Deuren s.c.

(57) ABSTRACT

An extendible or adjustable length level is provided. The level includes a locking mechanism allowing the user to fix the level at a selected or desired level. The locking system allows the user to lock the level at the desired length and provides more effective and robust locking than conventional expanding levels. In some embodiments the locking mechanism is designed such that translational movement of the user-actuated control (as opposed to rotational motion) is used to move the locking mechanism into the locked position.

20 Claims, 15 Drawing Sheets

(56) References Cited

U.S. PATENT DOCUMENTS

| | | |
|---|---|---|
| 2,627,115 A | 2/1953 | Pippin |
| 2,770,046 A | 11/1956 | Wichmann |
| 2,829,741 A | 4/1958 | Selberg et al. |
| 2,909,839 A | 10/1959 | Miller |
| 3,104,477 A | 9/1963 | Edwill |
| 3,200,508 A * | 8/1965 | Harper .................... B21D 5/02 33/371 |
| 3,220,297 A | 11/1965 | Baker et al. |
| 3,383,772 A | 3/1968 | Gardner et al. |
| 3,648,378 A | 3/1972 | Thingstad et al. |
| 3,680,214 A | 8/1972 | Quenot |
| 4,099,331 A | 7/1978 | Peterson |
| 4,112,584 A | 9/1978 | Kooi et al. |
| 4,130,943 A | 12/1978 | Talbot |
| 4,150,492 A | 4/1979 | Tracy |
| 4,152,838 A * | 5/1979 | Cook ...................... G01C 9/28 33/342 |
| 4,319,405 A | 3/1982 | Price |
| 4,399,616 A | 8/1983 | Jansson |
| 4,435,908 A | 3/1984 | Semler, Jr. |
| 4,621,431 A | 11/1986 | Fatool et al. |
| 4,894,925 A | 1/1990 | Langmaid |
| 4,928,395 A | 5/1990 | Good |
| 5,155,917 A | 10/1992 | Townsend et al. |
| 5,249,365 A | 10/1993 | Santiago |
| 5,388,338 A | 2/1995 | Majors |
| 5,412,875 A | 5/1995 | Hilderbrandt |
| 5,433,011 A | 7/1995 | Scarborough et al. |
| 5,524,353 A | 6/1996 | Fink |
| 5,577,327 A | 11/1996 | Archambault |
| 5,617,641 A | 4/1997 | Aarhus |
| 5,832,618 A | 11/1998 | Scarborough |
| 5,881,468 A | 3/1999 | Baumann |
| 5,915,810 A | 6/1999 | Cameron |
| 6,041,510 A | 3/2000 | Huff |
| 6,047,478 A | 4/2000 | Sowers |
| 6,085,434 A | 7/2000 | Mitchell |
| 6,138,369 A | 10/2000 | Mushin |
| 6,148,529 A | 11/2000 | Kennedy |
| 6,167,631 B1 | 1/2001 | Lin |
| 6,279,240 B1 | 8/2001 | Bonaventura, Jr. |
| 6,293,023 B1 | 9/2001 | Crowe |
| 6,293,024 B1 | 9/2001 | Fiebig et al. |
| 6,637,120 B2 | 10/2003 | Pustay |
| 6,640,455 B1 | 11/2003 | Smothers |
| 6,658,752 B1 | 12/2003 | Bonaventura |
| 6,915,585 B2 | 7/2005 | Von Wedemeyer |
| 6,915,588 B1 | 7/2005 | Gay |
| 7,086,166 B2 | 8/2006 | Helda et al. |
| 7,281,335 B2 | 10/2007 | Feliciano |
| 7,290,346 B2 | 11/2007 | Szumer et al. |
| 7,299,560 B2 | 11/2007 | Diaz et al. |
| 7,497,022 B1 | 3/2009 | Aarhus |
| 7,520,066 B2 | 4/2009 | Richins |
| 8,225,520 B2 | 7/2012 | Rabin |
| 8,413,343 B2 | 4/2013 | Hale |
| 8,539,686 B2 | 9/2013 | Lais |
| 8,739,423 B1 * | 6/2014 | Cortum .................... G01C 9/28 33/613 |
| D750,512 S | 3/2016 | Wojciechowski et al. |
| 2002/0073565 A1 * | 6/2002 | Schooley ................ G01C 9/28 33/374 |
| 2002/0116833 A1 | 8/2002 | Hollenbeck |
| 2002/0121026 A1 * | 9/2002 | Pustay .................... G01C 9/28 33/374 |
| 2004/0172846 A1 | 9/2004 | McRae |
| 2009/0113733 A1 | 5/2009 | Hale |
| 2013/0326895 A1 * | 12/2013 | Bureau .................... G01C 9/26 33/381 |
| 2017/0284784 A1 * | 10/2017 | Fuda ........................ B43L 7/10 |
| 2018/0094925 A1 * | 4/2018 | Mackey ................... G01C 9/34 |
| 2020/0018597 A1 * | 1/2020 | Tang ........................ G01C 9/26 |
| 2020/0132455 A1 * | 4/2020 | Sanders ................... G01C 9/34 |
| 2020/0149856 A1 * | 5/2020 | Miller ...................... G01B 3/06 |
| 2020/0232795 A1 * | 7/2020 | Woryk ..................... G01B 3/06 |

FOREIGN PATENT DOCUMENTS

| | | |
|---|---|---|
| EP | 1395792 | 2/2008 |
| GB | 1155287 | 6/1969 |
| GB | 2371583 | 7/2002 |
| JP | H11295003 | 10/1999 |
| JP | 2003014457 | 1/2003 |
| TW | M263493 | 5/2005 |
| WO | WO1987002314 | 4/1987 |
| WO | WO1992020998 | 11/1992 |
| WO | WO9504915 | 2/1995 |
| WO | WO1997029345 | 8/1997 |
| WO | WO9841817 | 9/1998 |
| WO | WO2000063644 | 10/2000 |
| WO | WO2003106926 | 12/2003 |

* cited by examiner

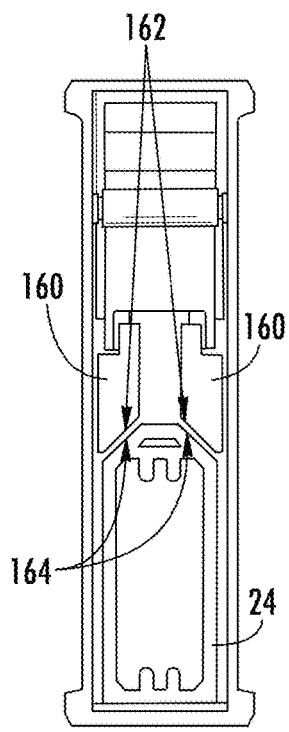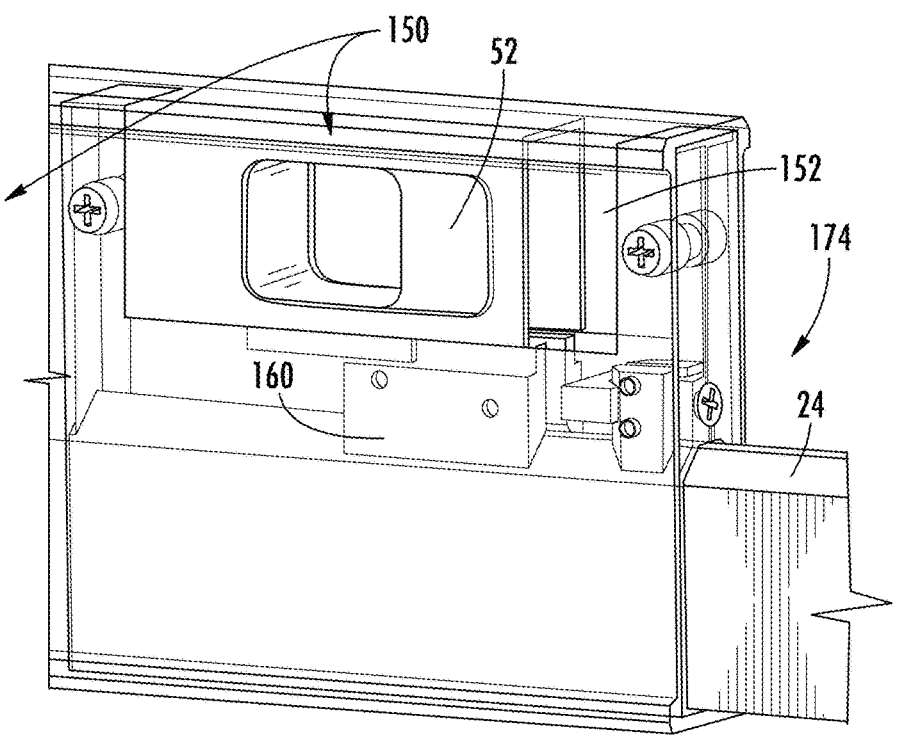
FIG. 13A  FIG. 13B
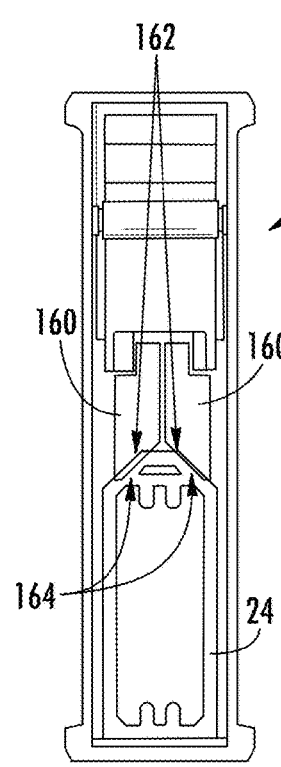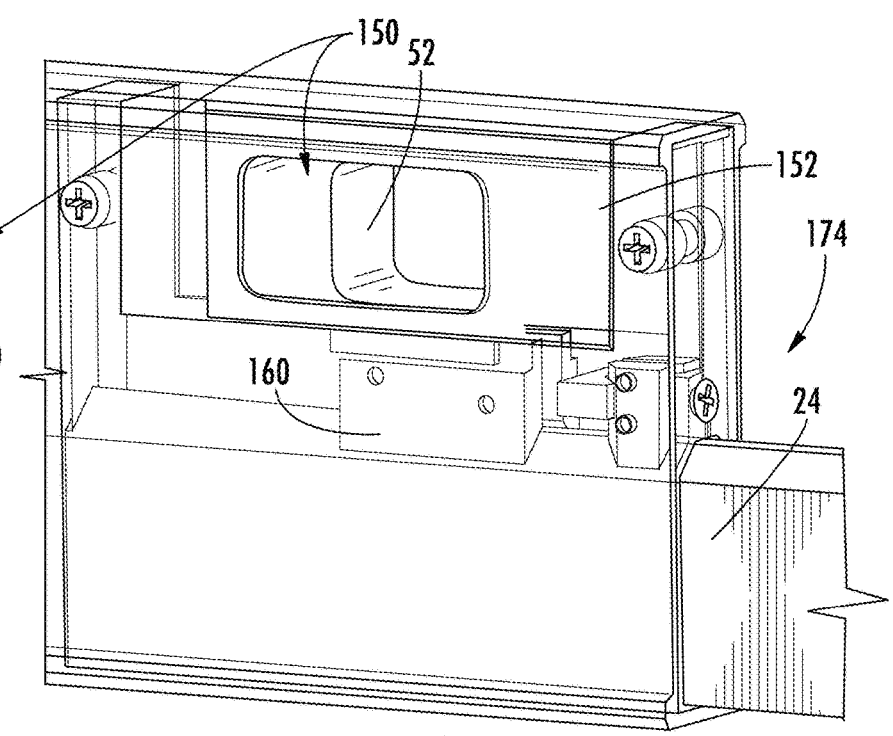
FIG. 14A  FIG. 14B

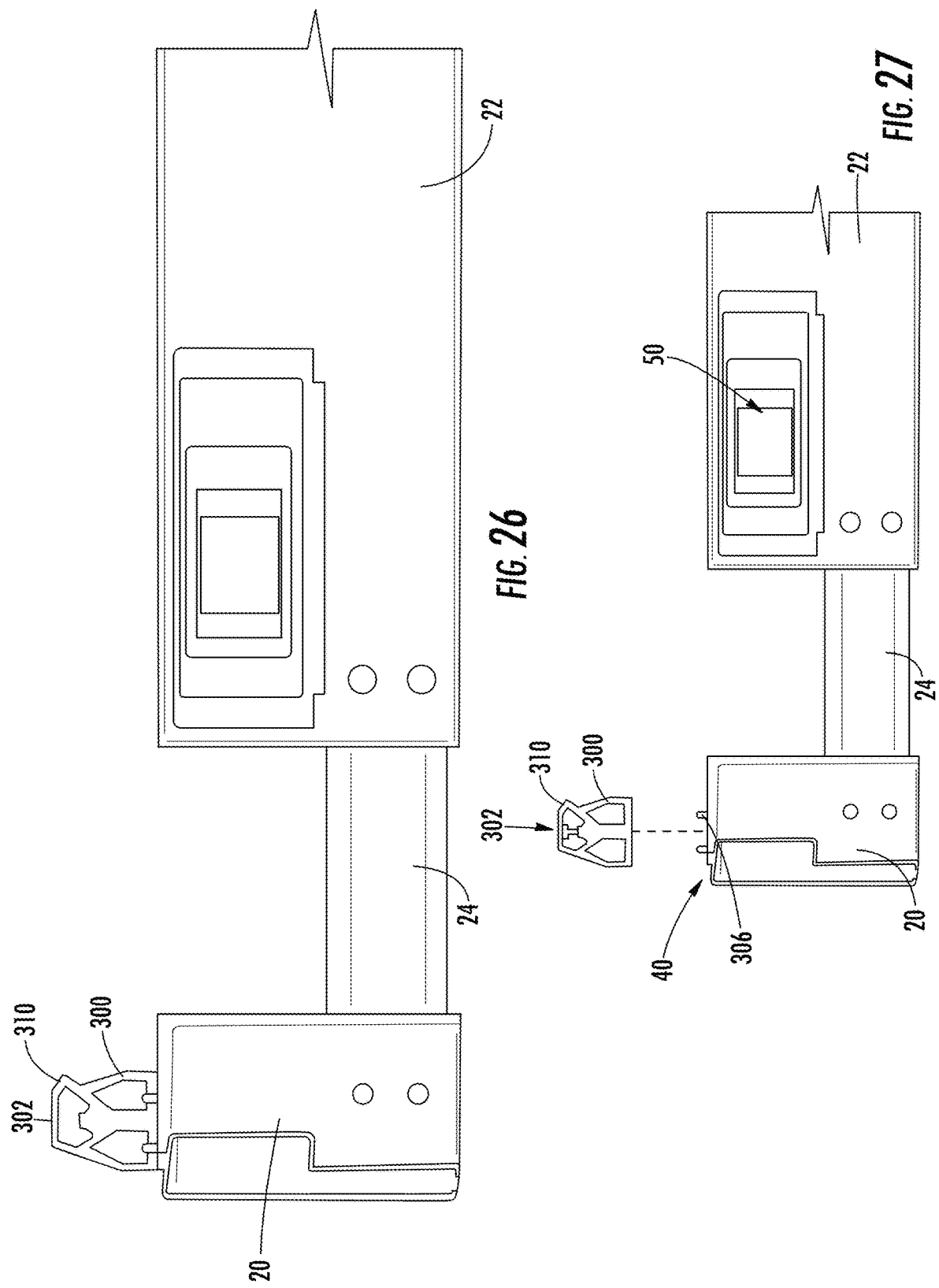

LENGTH ADJUSTABLE LEVEL

CROSS-REFERENCE TO RELATED PATENT APPLICATIONS

This application is a continuation of International Application No. PCT/US2019/019587, filed on Feb. 26, 2019, which claims priority from U.S. Application No. 62/635,922, filed Feb. 27, 2018, the contents of which are incorporated herein in their entireties.

BACKGROUND OF THE INVENTION

The present invention relates generally to the field of tools. The present invention relates specifically to a tool, such as a level or a spirit level, that is extendable such that its length may be adjusted as needed by a user. Levels, such as spirit levels, are used to determine the levelness of a structure, surface or workpiece. In use, the level is placed on or in contact with a surface to be measured, and the user views the location of a bubble within a vial (or other levelness indicator) relative to markings that indicate the levelness of the structure, surface or workpiece.

SUMMARY OF THE INVENTION

One embodiment of the invention relates to a level configured to have an adjustable longitudinal length. The level includes a fixed outer body member coupled at a fixed position to an inner body member and a slidable outer body member slidably coupled to the inner body member and opposing the fixed outer body member. The level includes a locking mechanism moveable between a locked position in which the slidable outer body member is locked relative to the inner body member and an unlocked position in which the slidable outer body member is allowed to move relative to the inner body member.

In various embodiments, the locking mechanism includes a user operated control. The user operated control is configured such that translational movement (or non-rotational movement) of the control moves the locking mechanism between locked and unlocked positions. In a specific embodiment, the translational movement is parallel to one or more working surfaces of the level.

In various embodiments, when viewed in longitudinal cross-section, the slidable outer body member has a vertically extending central wall, an upper wall defining an upper working surface located at an upper end of the central wall, and a lower wall structure extending from a lower end of the central wall defining a longitudinally extending cavity. The inner body member is received within the longitudinally extending cavity. In specific embodiments, the lower wall structure completely surrounds the inner body member when viewed in longitudinal cross-section, at at least some cross-sectional locations. The locking mechanism is supported by the slidable outer body member within an aperture extending through the central wall. In various embodiments, the locking mechanism is accessible from both left and right side surfaces of the level when the level is in a fully collapsed (e.g., minimum length) position.

In one embodiment the level comprises an inner body member that extends along a longitudinal axis, a first body portion coupled to the inner body member, a second body portion slidably coupled to the inner body member, a level sensing device, and a locking mechanism coupled to the second body portion. The first body portion comprises a first planar base surface and a first top surface opposing the base surface. The second body portion comprises a second planar base surface coplanar with the first planar base surface and a second top surface coplanar with the first top surface. The first and second base surfaces collectively define a working base surface and the first and second top surfaces collectively defines a working top surface. The locking mechanism comprises a user actuated control, wherein the user actuated control is configured such that translational movement of the user actuated control moves the locking mechanism between a locked position and an unlocked position. Relative positions of the first body portion and the second body portion define a fully retracted position and a fully extended position, the fully retracted position defining a shortest working length of the level along the longitudinal axis and the fully extended position defining a longest working length of the level along the longitudinal axis.

In another embodiment a level comprises a fixed body member, an extended body member that extends along a longitudinal axis, a slidable body member slidably coupled to a second end of the extended body member, an orientation measuring component, and a locking mechanism. The fixed body member is coupled to a first end of the extended body member and comprises a first planar base surface and a first top surface opposing the base surface. The slidable body member comprises a second planar base surface coplanar with the first planar base surface, the first and second base surfaces collectively defining a working base surface, and a second top surface coplanar with the first top surface, the first and second top surfaces collectively defining a working top surface. The locking mechanism comprises a user actuated control, wherein the user actuated control is configured such that movement of the user actuated control moves the locking mechanism between a locked position and an unlocked position. Relative positions of the fixed body member and the slidable body member define a fully retracted position and a fully extended position, the fully retracted position comprising a shortest working length of the level along the longitudinal axis and the fully extended position comprising a longest working length of the level along the longitudinal axis. The user actuated control of the locking mechanism is accessible to a user when the level is in the fully retracted position.

In another embodiment a level comprises an inner body member that extends along a longitudinal axis, a first body portion coupled to the inner body member, a second body portion slidably coupled to the inner body member, a level sensing device supported by the second body member, and a locking mechanism. The first body portion comprises a first planar base surface and a first top surface opposing the base surface. The second body portion comprises a second planar base surface coplanar with the first planar base surface, the first and second base surfaces collectively defining a working base surface, a second top surface coplanar with the first top surface, the first and second top surfaces collectively defining a working top surface, a central wall, an upper wall that defines to the second top surface coupled to an upper end of the central wall, and a box structure coupled to a lower end of the central wall and defining a channel that receives the inner body member. The user actuated control is coupled to the central wall of the second body member and configured such that movement of the user actuated control moves the locking mechanism between a locked position and an unlocked position. Relative positions of the first body portion and the second body portion define a fully retracted position and a fully extended position, the fully retracted position comprising a shortest working length of the level along the longitudinal axis and the fully extended position comprising a longest working length of the level along the longitudinal axis.

In various embodiments, the level includes an adjustable friction mechanism supported by the slidable outer body member that applies an adjustable amount of friction against the inner body member.

Additional features and advantages will be set forth in the detailed description which follows, and, in part, will be readily apparent to those skilled in the art from the description or recognized by practicing the embodiments as described in the written description and claims hereof, as well as the appended drawings. It is to be understood that both the foregoing general description and the following detailed description are exemplary.

The accompanying drawings are included to provide a further understanding and are incorporated in and constitute a part of this specification. The drawings illustrate one or more embodiments and together with the description serve to explain principles and operation of the various embodiments.

BRIEF DESCRIPTION OF THE DRAWINGS

FIG. 13A is a longitudinal cross-sectional view of a level and locking mechanism in the unlocked position within the body portion of FIG. 12, according to an exemplary embodiment.

FIG. 13B is a side view of the level and locking mechanism of FIG. 13A, according to an exemplary embodiment FIG. 14A is a longitudinal cross-sectional view of the level and locking mechanism of FIG. 13A in the locked position, according to an exemplary embodiment.

FIG. 14B is a side view of the level and locking mechanism of FIG. 14A, according to an exemplary embodiment

FIG. 26 is a side view of the standoff of FIG. 25 mounted to a fixed body portion of an extendable level, according to an exemplary embodiment.

FIG. 27 is a side view of the standoff of FIG. 26 prior to mounting to or after removal from a fixed body portion of an extendable level, according to an exemplary embodiment.

DETAILED DESCRIPTION

Figure 1:
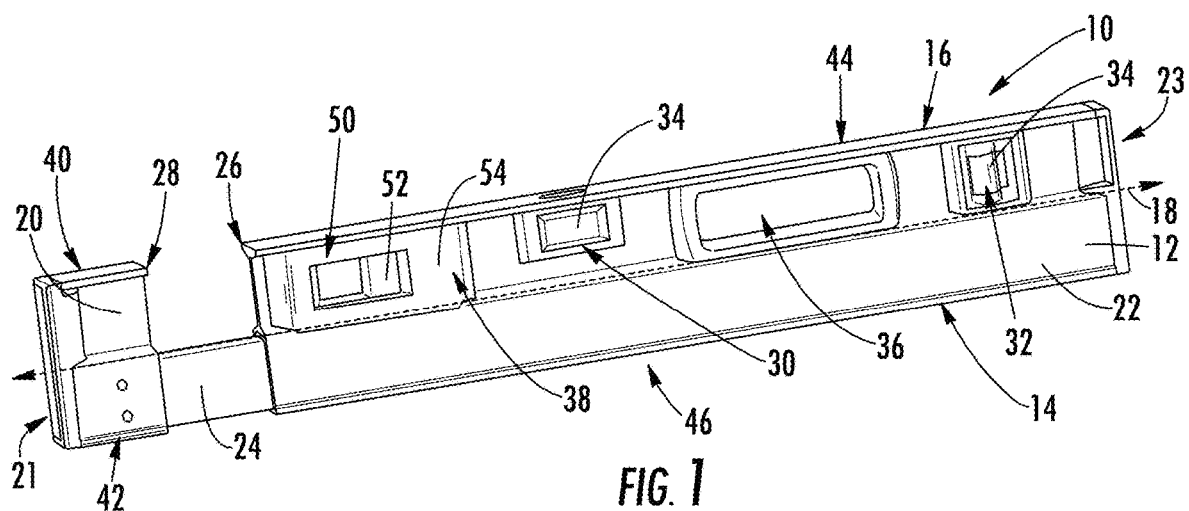
FIG. 1 is a perspective view of a level, according to an exemplary embodiment.

Referring generally to the figures, various embodiments of a level, such as a spirit level, are shown. In general, levels have one or more precision surfaces used for engagement with a workpiece during leveling. The level discussed herein is designed such that the level's length can be adjusted by the user as needed for various leveling applications. As will be discussed in more detail below Applicant has developed a locking system that allows the user to lock the level at the desired length that Applicant believes provides more effective and robust locking than conventional expanding levels.

For example, Applicant's locking mechanism provides for a large engagement surface that engages an inner body portion when the level is locked at the desired length.

Applicant has found that by using a locking mechanism with a large engagement surface, the locking force is evenly distributed over a large area which limits the potential of distorting or misaligning the precision measuring surfaces when the locking force is applied. In addition, in specific embodiments, the locking mechanism is designed such that translational movement of the user actuated control (as opposed to rotational motion) is used to move the locking mechanism into the locked position. Applicant believes that, in contrast to rotational or lever-type lock controls, the translational movement is easy to operate and facilitates the even application and distribution of locking force.

Further, in various embodiments, the locking mechanism includes additional design aspects that Applicant believes improves function of the extendable level discussed herein. For example, the outer level body profile and the user actuated control for the locking mechanism are designed such that the user actuated control for the locking mechanism is always accessible to the user, and specifically is accessible both when the level is in the fully retracted position, when the level is in the fully extended position and at any position in between. Specifically, by providing user access to the locking mechanism control when the level is in the fully collapsed position, the locking mechanism discussed herein allows the level to be placed into the locked position when the level is in the fully retracted position.

Further, in various embodiments, the control for the locking mechanism is placed along the level body spaced from the gap or separation created between opposing portions of the outer level body when the level is in an extended position. Thus, this design does not require the user's fingers to be placed in this gap to actuate the locking mechanism which reduces the chance that the user's fingers get pinched between the outer level body sections.

Further, in various embodiments, the outer level body includes an upper portion having an I-beam cross-sectional profile, and a lower section defining a hollow region within which the inner body member is located. This body shape provides for easy gripping/handling along the upper I-beam wall that extends the entire length of the level, while also providing an internally received telescoping inner body member. Applicant believes that conventional extending levels do not provide this combination of design features. Further, this outer body design allows for the user actuated control for the locking mechanism to be positioned through the vertical wall of the I-beam structure such that it is accessible from either side of the level when the level is in both fully retracted and expanded positions.

In various embodiments, the locking mechanism includes a friction member that ensures that some level of friction is provided between the locking mechanism and the inner body member even when the locking mechanism is in the unlocked position. This friction acts to control movement of the inner body member as it slides into or out of the outer body member when the locking mechanism is in the unlocked position. In specific embodiments, the amount of friction provided by the friction member is adjustable by the user which allows the user to select how easily the outer body member is permitted to slide relative to the inner body member. This friction mechanism prevents/limits fast and/or unintended sliding between the two level components when the locking mechanism is unlocked, and assists the locking mechanism in restricting movement when the locking mechanism is in the locked position.

Referring to FIG. 1, an extendable, expandable or length adjustable level, such as level 10, is shown according to an exemplary embodiment. In general, level 10 is extendable in that its length is reversibly adjustable allowing the user to increase and decrease the length of level 10 as may be needed for various uses.

In general, level 10 includes an outer body 12 that includes a base surface 14 and an opposing top surface 16. Base surface 14 and top surface 16 are flat, planar surfaces that can be used to engage a surface of a workpiece to be measured using level 10. In some specific embodiments, base surface 14 and/or top surface 16 are machined to have a flat, flush or planar surface following formation of outer body 12 (e.g., following extrusion of a metal forming outer body 12), and in some embodiments, this machined surface may be anodized. Surfaces 14 and 16 may be referred to as working surfaces of level 10. Surfaces 14 and 16 are planar surfaces that are parallel to each other and are also parallel to a longitudinal axis 18 of level 10.

Outer body 12 includes a first body portion, shown as fixed portion 20, also referred to as fixed body member 20, and a second body portion, shown as slidable portion 22, also referred to as slidable body member 22. In general, fixed portion 20 is rigidly and/or permanently coupled to inner body 24 at a first end 21 of level 10, and slidable portion 22 slidably engages inner body 24. Slidable portion 22 defines a second end 23 of level 10 located at the end of slidable body member 22 opposite from fixed portion 20. In general, to expand level 10, slidable portion 22 is moved along inner body 24, also referred to as extended body member 24, away from fixed portion 20 along longitudinal axis 18, and to retract/collapse level 10, slidable portion 22 is moved along inner body 24 toward fixed portion 20.

In some embodiments, inner body 24 is sized such that its entire length fits within slidable portion 22. Thus, when level 10 is moved to the fully retracted or collapsed position, an inward facing edge 28 of fixed portion 20 abuts an inward facing edge 26 of slidable portion 22. In this completely collapsed position, fixed portion 20 and slidable portion 22 come together completely covering inner body 24.

Referring to FIG. 1, level 10 includes a plurality of bores formed in slidable body portion 22. As shown in FIG. 1, level 10 includes a first vial opening 30, a second vial opening 32 and a handhold opening 36 formed through slidable portion 22 of outer body 12. Openings 30 and 32 each receive a level sensing device, shown as level vial 34 (e.g., bubble vials, spirit vials, etc.) which are supported by slidable body portion 22 in the appropriate orientation relative to surfaces 14 and/or 16 in order for the vials to indicate the angle, levelness, degree of plumb, etc. of the corresponding surface of a workpiece, as needed for a particular level design or level type. It should be understood, that level 10 may include less than two level vials or more than two level vials as may be desired for a particular level design. Further, level 10 may be equipped with other orientation measuring components, level sensing and indicating devices other than spirit level vials. For example, level 10 may be equipped with digital/electronic level sensors and display(s) instead of or in addition to level vials 34.

To allow level 10 to provide planar working surfaces at different lengths, the upper and lower surfaces of fixed portion 20 and of slidable portion 22 are coplanar with each other. Specifically, fixed portion 20 includes an upper surface 40 and a lower surface 42, and slidable portion 22 includes an upper surface 44 and a lower surface 46. Upper surface 40 is coplanar with upper surface 44, and/or lower surface 42 is coplanar with lower surface 46. In this arrangement, upper surface 40 and upper surface 44 operate together providing top working surface 16 of level 10 at all adjustable lengths of level 10, from fully extended to fully retracted.

Similarly, lower surface 42 and lower surface 46 operate together providing base surface 14 of level 10 at all adjustable lengths of level 10, from a fully extended position to a fully retracted position, wherein the fully retracted position comprises the shortest working length of the level along the longitudinal axis and the fully extended position comprises the longest working length of the level along the longitudinal axis. Unlike a standard fixed length level with a single integral body that defines the working surfaces, one difficulty with expandable levels is the ability to maintain the coplanar nature of the working surfaces on opposing outer body portions, while at the same time providing a robust and easy to use locking mechanism. As will be discussed in more detail below, the locking mechanisms and/or frame designs discussed here are believed to address both of these potential design issues.

Figure 2A:
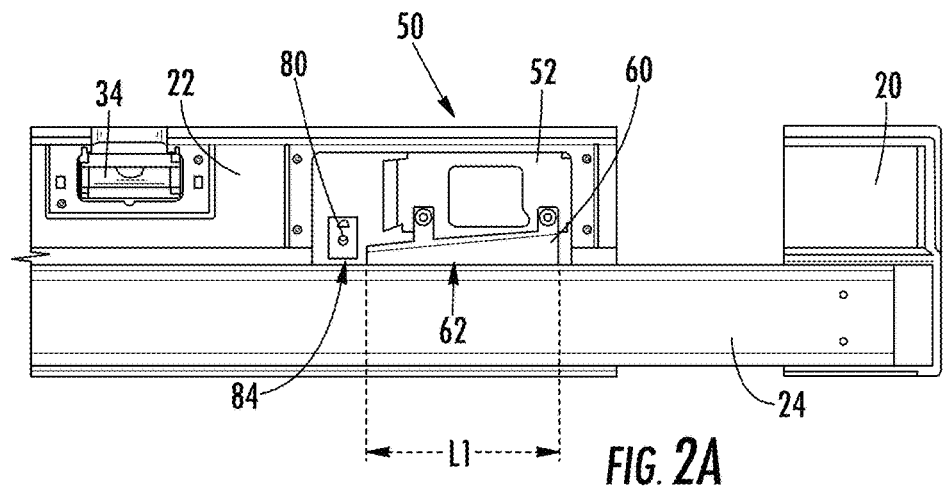
FIG. 2A is a cross-sectional side view of the level of FIG. 1 showing a locking mechanism, according to an exemplary embodiment.
Figure 2B:
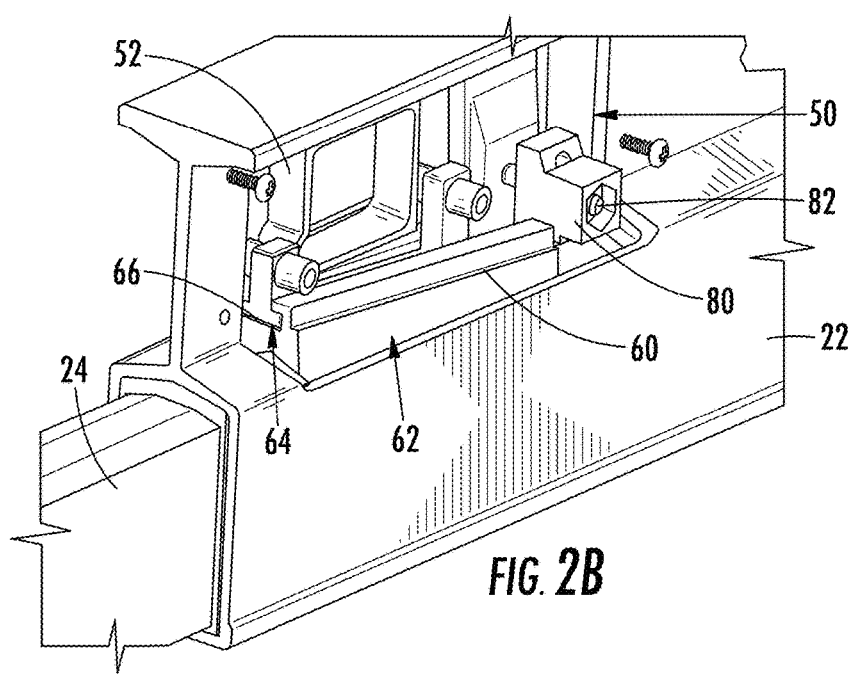
FIG. 2B is a perspective view of the locking mechanism of FIG. 2A with a locking mechanism frame removed, according to an exemplary embodiment.
Figure 3:
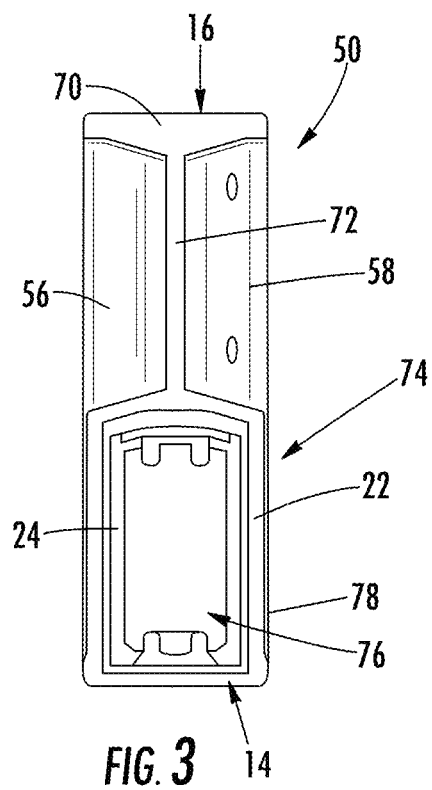
FIG. 3 is a longitudinal cross-section view of the level of FIG. 1, according to an exemplary embodiment.

Referring to FIGS. 1-3, in addition to the bores for the vials and handholds, level 10 includes an opening 38 formed through slidable portion 22 that receives locking mechanism 50. Locking mechanism 50 includes a user actuated control, shown as slide 52, and a locking mechanism frame 54. In general, slide 52 is the control mechanism that the user operates to move the locking mechanism between locked and unlocked positions. In the locked position, an engagement structure engages inner body member 24, fixing slidable body portion 22 in place onto inner body member 24, which also fixes sliding body member 22 in place relative to fixed body member 20. Through this mechanism, the user is able to set the longitudinal length of level 10 as desired. In various embodiments slide 52 is at least partially disposed within opening 38.

As shown in FIG. 3, locking mechanism frame 54 includes left and right portions 56 and 58 that are coupled to slidable body portion 22 and that supports the various components of locking mechanism 50 relative to slidable body portion 22. In this arrangement, left and right portions 56 and 58 are attached to the outer side surfaces of slidable body portion 22 and support the components of locking mechanism 50 in place within opening 38.

In contrast to at least some expanding level designs that utilize lever-based locking mechanisms, locking mechanism 50 is configured such that translational or linear movement of slide 52 cause locking mechanism 50 to move between the locked and unlocked positions. In the arrangement of locking mechanism 50 shown in FIGS. 2A and 2B, translational movement of slide 52 in a direction parallel to at least one of working surfaces 14 and 16 causes engagement/disengagement of locking mechanism 50.

Referring to FIGS. 2A and 2B, the structure and operation of locking mechanism 50 are shown in more detail. Locking mechanism 50 includes a brake structure 60, also referred to as braking structure 60. Brake structure 60 includes a lower engagement surface 62 and an angled upper surface 64. Lower engagement surface 62 provides frictional engagement (either directly or indirectly) to the upper surface of inner body member 24, when in the locked position. This frictional engagement holds slidable body member 22 in place relative to inner body member 24, when locking mechanism 50 is in the locked position.

Locking mechanism 50 includes an opposing ramp structure 66 that is coupled to slide 52 and that engages brake structure 60 along angled upper surface 64. Through the interaction of the angle of ramp structure 66 and angled upper surface 64 of brake structure 60, horizontal movement of slide 52 is translated into vertical movement of brake structure 60 relative to inner body member 24. Thus, when slide 52 is moved in a first direction (e.g., translated horizontally away from fixed outer body portion 20), brake structure 60 is pulled upward away from inner body portion 24 to the unlocked position. In the unlocked position, this movement causes brake engagement surface 62 to disengage from inner body portion 24, and slidable body portion 22 is allowed to slide along inner body portion 24. When slide 52 is moved in a second direction (e.g., translated horizontally toward fixed outer body portion 20), brake structure 60 is pushed downward toward inner body portion 24 to the locked position. In the locked position, brake engagement surface 62 is pressed into frictional engagement with inner body portion 24 such that slidable body portion 22 is fixed in place relative to inner body portion 24.

As will be understood, application of locking force by locking mechanism 50 in a consistent manner allows for consistent coplanar alignment of the working surfaces of body portions 20 and 22 when in the locked position. In comparison to other locking mechanisms of prior expandable level designs that utilize screw type or lever type locking mechanisms, Applicant believes that the design locking mechanism 50 provides for an improved leveling accuracy when in the locked position. In particular, brake engagement surface 62 is relatively large such that the requisite frictional locking force is distributed over a large area, which in turn limits the deformation of working surfaces of level 10 which may otherwise occur in other locking member designs.

As shown best in FIG. 2A, engagement surface 62 has a length, L1, that is relatively large, particularly as compared to the longitudinal length of level 10. In various embodiments, L1 is between 30 mm and 300 mm, specifically is between 50 mm and 150 mm, and more specifically is between 70 mm and 90 mm, and even more specifically is between 80 mm and 85 mm, and even more specifically is 82.7 mm. In various other embodiments L1 is at least 30 mm, at least 50 mm, or at least 70 mm. In specific embodiments, the ratio of L1 to the minimum length (i.e., fully retracted length) of level 10 is between 1:10 and 1:30, and more specifically is between 1:15 and 1:30, and more specifically is 14.74:1 or 23.96:1. In specific embodiments the ratio of L1 to the maximum length (i.e., fully extended length) of level 10 is between 1:15 and 1:50, and more specifically between 1:20 and 1:40, and more specifically 1:23.96 or 1:44.23. Applicant believes that the size of L1 and the L1 ratio discussed above represents a large engagement contact area which results in less deformation, particularly when compared to other locking mechanisms such as lever-type clamping mechanisms that have small contact surfaces.

The relatively large size of engagement surface 62 can also be expressed in terms of the area of engagement surface 62. In various embodiments, the area of engagement surface 62 is between 500 mm$^2$ and 3000 mm$^2$, specifically between 800 mm$^2$ and 1500 mm$^2$ and more specifically between 1000 mm$^2$ and 1400 mm$^2$ and more specifically is between 1200 mm$^2$ and 1400 mm$^2$ and more specifically is 1348 mm$^2$. In various other embodiments the area of engagement surface 62 is at least 500 mm$^2$, at least 800 mm$^2$, or at least 1000 mm$^2$. Applicant believes that by increasing the size, and particularly the length of engagement surface 62, the potential for bending of inner body member 24 around the contact point with the brake engagement surface is decreased by holding inner body member 24 in a cantilevered fashion from the lock engagement area.

Referring to FIG. 3, the design of the level body, particularly of body portions 20 and 22, of level 10 is shown. As shown in FIG. 3, a longitudinal cross-sectional view of slidable body portion 22 is shown according to an exemplary embodiment. In general, slidable body portion 22 includes an upper portion that is similar to an I-beam level and a lower portion that defines a channel that receives inner body portion 24.

Specifically, slidable body portion 22 includes an upper wall 70 that defines top working surface 16 located at the upper end of a generally vertical wall or web, shown as wall 72. Applicant believes that upper wall 70 provides an easy to hold structure located along the entire upper end of level 10.

A box structure 74 is located at the lower end of wall 72 and includes an inner surface defining channel 76 and a lower wall defining base surface 14. In this arrangement, the wall 78 that defines box structure 74 is a closed, contiguous wall (at least at some places on the length of level 10) that surrounds and defines channel 76. As can be seen in FIGS. 2A and 3, channel 76 slidably receives inner body member 24, allowing slidable body member 22 to be moved along inner body member 24 during length adjustment. Applicant believes that by surrounding inner body member 24 with box structure 74 to provide the telescoping engagement of the level, a robust connection between inner body member 24 and slidable body member 22 is provided (at least compared to the partial engagement of rail type structures present in some prior designs). It should be noted that, in at least some embodiments, fixed level body portion 20 has the same frame shape as slidable body member 22 discussed above.

Further, in contrast to some conventional expanding level designs, this frame shape allows for positioning and easy accessibility to slide 52 (e.g., the locking mechanism control). As shown in FIGS. 1 and 3, opening 38 extends through vertical wall 72, and slide 52 is positioned within and extends through opening 38. In this arrangement, because slide 52 is not located within a cavity of the level body, slide 52 is accessible to the user at any extended or collapsed position (including at the fully retracted position). Further, in this arrangement, slide 52 is accessible from either side of level 10, allowing the user to conveniently move between locked and unlocked positions from either side of level 10.

As shown in FIGS. 2A and 2B, in various embodiments, level 10 includes a friction element, shown as adjustable friction element 80. In general, friction element 80 is positioned to contact inner body member 24 to provide a constant but relatively low level of friction to control the sliding of slidable body member 22 relative to inner body member 24 when locking mechanism 50 is in the unlocked position. By providing a low level of friction, friction element 80 increases the amount of force that must be applied in order to slide slidable body member 22 along inner body member 24. This constant friction decreases the chance of unintended movement of slidable body member 22. In specific embodiments, friction element 80 is adjustable via an adjustment control (e.g., via a screw 82 or other mechanism) which allows the user to adjust the amount of friction applied by friction element 80, which in turn allows the user to adjust how free slidable body member 22 is to slide relative to inner body member 24. In various embodiments friction element 80 includes an engagement surface 84, and the position of engagement surface 84 relative to an opposing surface of inner body member 24 is adjusted via screw 82. Operation of screw 82 moves engagement surface 84 toward inner body member 24 to increase friction and away from inner body member 24 to decrease friction.

In the embodiment shown, friction element 80 is supported from locking mechanism frame 54 adjacent to brake structure 60. In one specific embodiment, friction element 80 is separate from locking mechanism 50 (e.g., is separate and separately adjustable from brake member 60) and is located between locking mechanism 50 and the central level vial 34.

Figure 4:
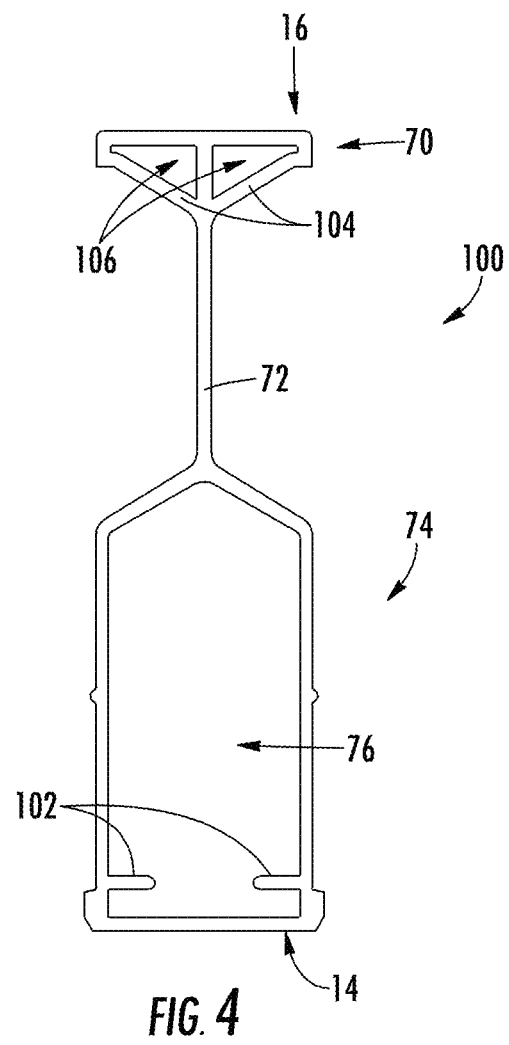
FIG. 4 is a longitudinal cross-section view of a level outer body portion, according to another exemplary embodiment.

Referring to FIG. 4, a slidable level body 100 is shown according to another exemplary embodiment. Slidable level body 100 is substantially the same as slidable level body portion 22 discussed above, except for the differences discussed herein. Level body 100 includes a pair of opposing internal arms 102 that are located within channel 76. In this embodiment, the lower surface of inner body member 24 engages arms 102. In some such embodiments, arms 102 prevent direct engagement between inner body member 24 and the lower wall that defines base surface 14. In at least some embodiments, this arrangement may decrease/limit the potential for deformation of base surface 14 when force is applied during locking of the locking mechanism.

In addition, level body 100 includes a pair of angled walls 104 that extend from central wall 72 to join upper wall 70. In this manner, upper cavities 106 are defined between walls 104, central wall 72 and upper wall 70 at the upper end of central wall 72. Because of the structural support provided by angled walls 104, this arrangement may allow for the overall thickness and amount of metal used for upper wall 70 to be decreased.

Figure 5:
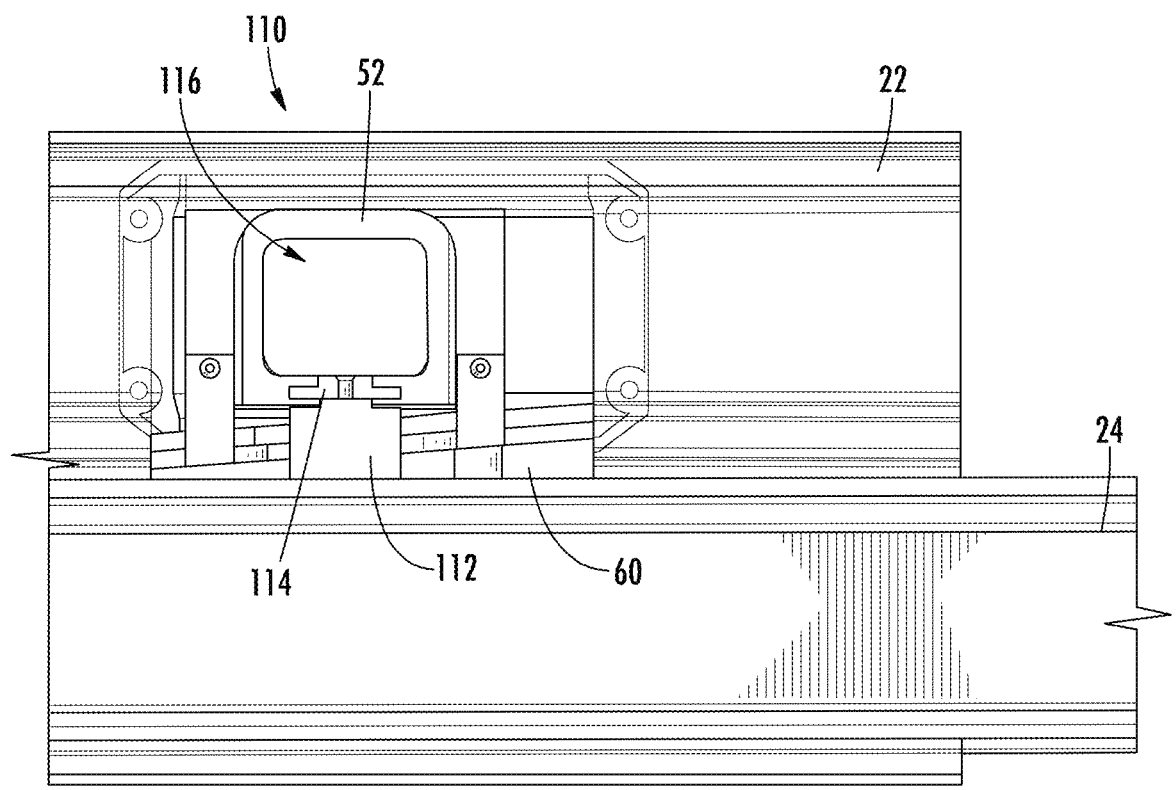
FIG. 5 is a cross-sectional side view of a level and a locking mechanism in the unlocked position, according to another exemplary embodiment.
Figure 6:
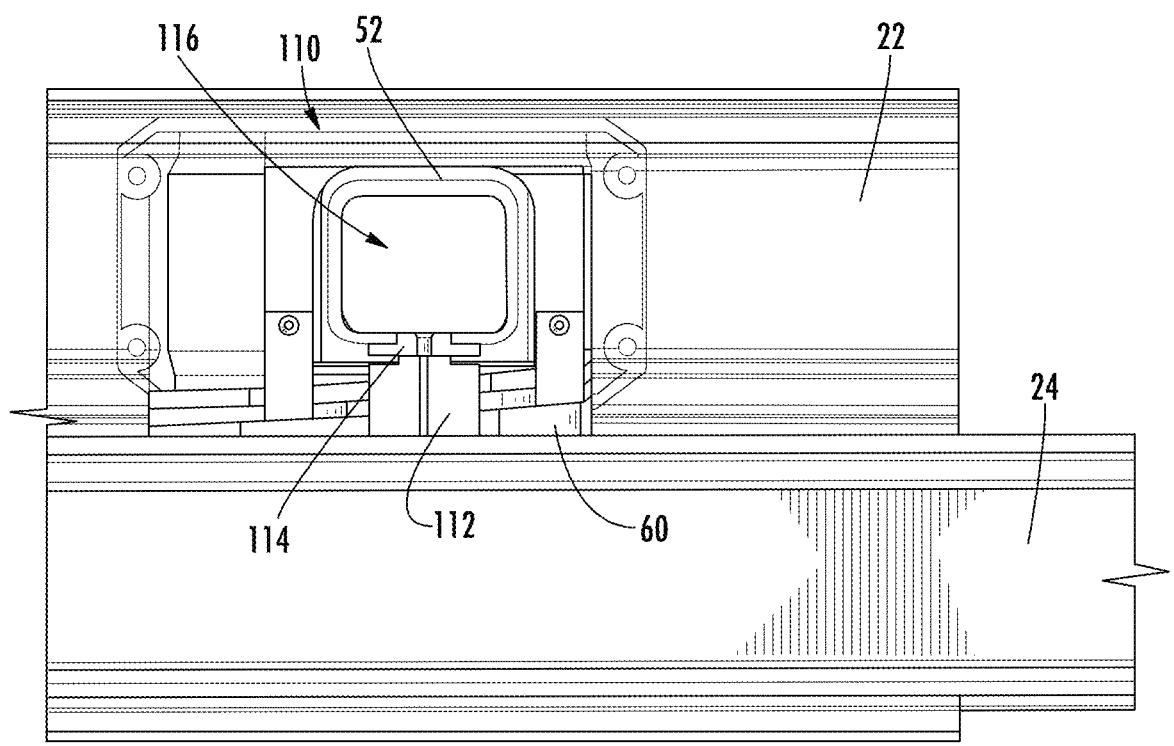
FIG. 6 is a cross-sectional side view of the level and the locking mechanism of FIG. 5 in the locked position, according to another exemplary embodiment.

Referring to FIGS. 5 and 6, a locking mechanism 110 for an extendable level, such as level 10, is shown according to another exemplary embodiment. Locking mechanism 110 is substantially the same as locking mechanism 50 discussed above, except for the differences discussed herein. FIG. 5 shows locking mechanism 110 in the unlocked position, and FIG. 6 shows locking mechanism 110 in the locked position. Locking mechanism 110 includes an adjustable friction element 112 that extends through brake element 60. Adjustable friction element 112 operates the same as friction element 80 discussed above. As shown, adjustment screw 114 that changes the amount of friction applied by friction element 112 is located and accessible within aperture 116 defined within slide 52. In addition, friction element 112 is coupled to slide 52 such that friction element 112 moves with slide 52 as locking mechanism 110 is moved between locked and unlocked positions.

Figure 7:
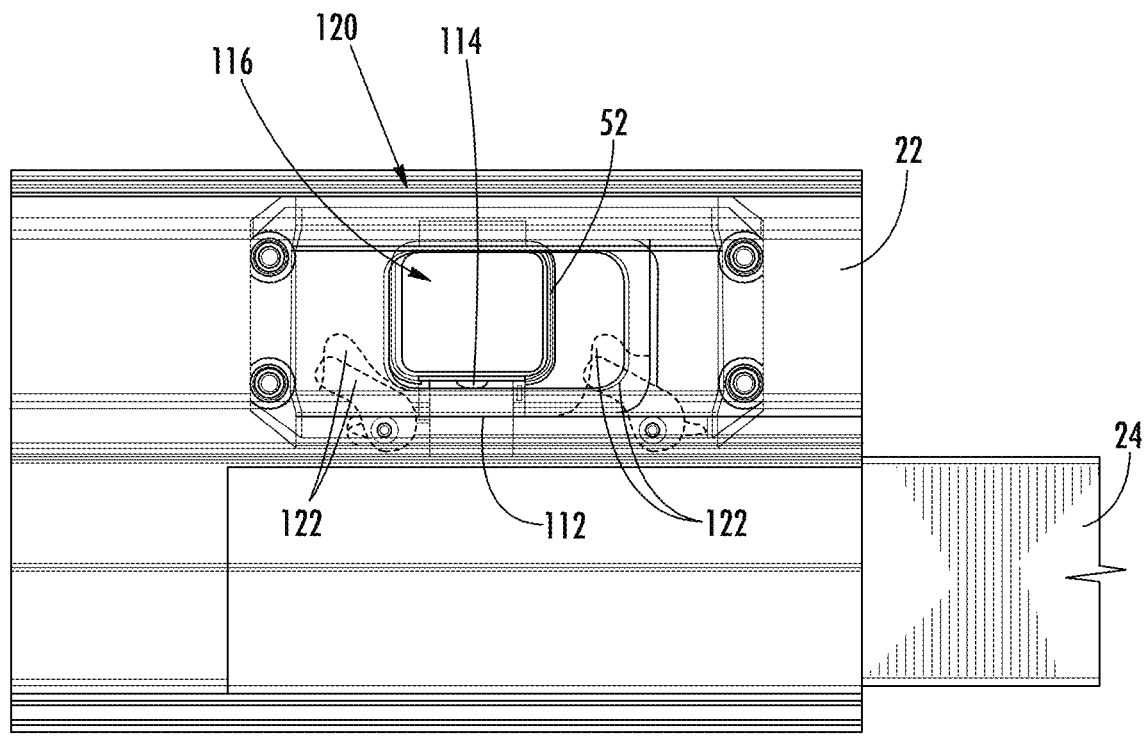
FIG. 7 is a cross-sectional side view of a level and a locking mechanism in the unlocked position, according to another exemplary embodiment.
Figure 8:
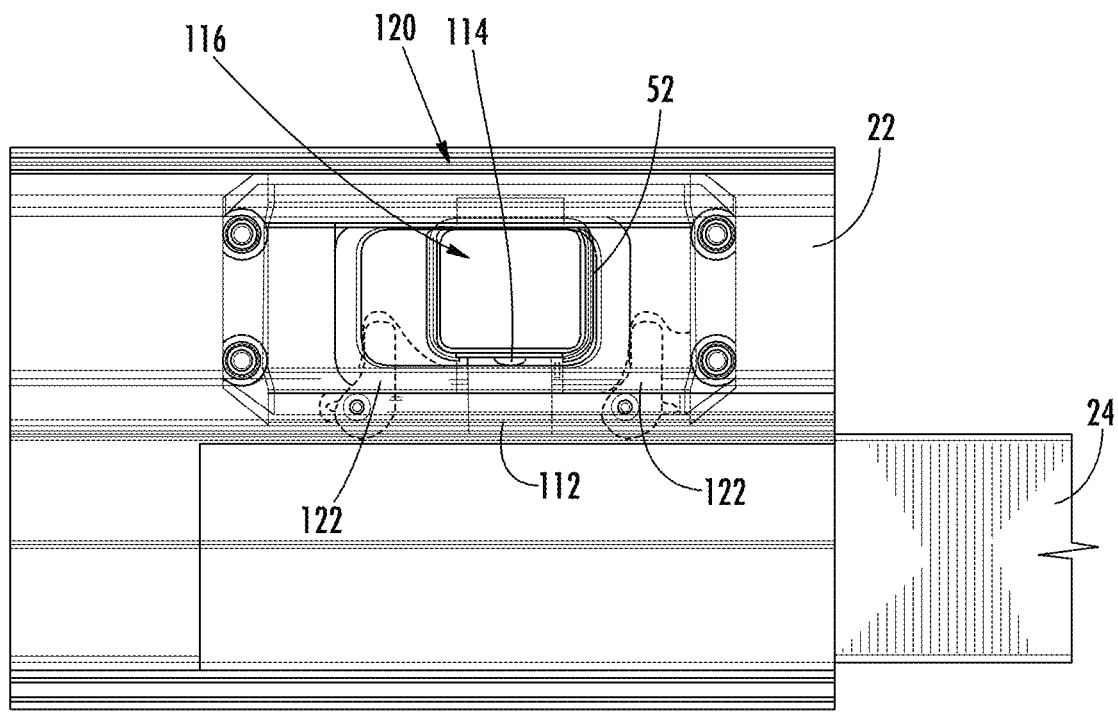
FIG. 8 is a cross-sectional side view of the level and the locking mechanism of FIG. 7 in the locked position, according to another exemplary embodiment.

Referring to FIGS. 7 and 8, a locking mechanism 120 for an extendable level, such as level 10, is shown according to another exemplary embodiment. Locking mechanism 120 is substantially the same as locking mechanism 50 discussed above, except for the differences discussed herein. FIG. 7 shows locking mechanism 120 in the unlocked position, and FIG. 8 shows locking mechanism 120 in the locked position. Locking mechanism 120 includes a plurality of brake elements, shown as pivoting cams 122. As slide 52 is moved from the unlocked position to the locked position, pivoting cams 122 pivot into engagement with the upper surface of inner body member 24 causing sliding body member 22 to be locked into place relative to inner body member 24. Similar to locking mechanism 110, locking mechanism 120 includes adjustable friction element 112 coupled to slide 52 and accessible through aperture 116.

Figure 9:
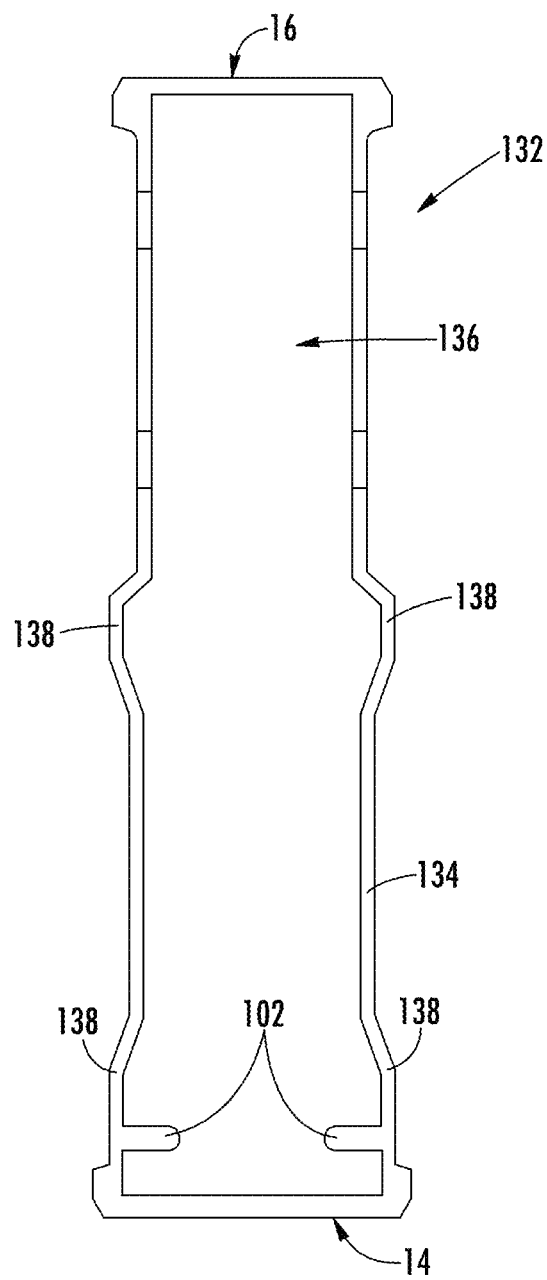
FIG. 9 is a longitudinal cross-section view of a level outer body portion, according to another exemplary embodiment.

Referring to FIGS. 9-11, a locking mechanism 130 and an associated slidable body member 132 are shown according to exemplary embodiments. Slidable body member 132 is substantially the same as slidable level body portion 22 discussed above, except for the differences discussed herein. Locking mechanism 130 is substantially the same as locking mechanism 50 discussed above, except for the differences discussed herein.

Slidable body member 132 is a box-type level body having a single contiguous wall structure 134 defining an internal cavity 136 that houses both inner body member 24 and locking mechanism 130. Wall structure 134 defines a plurality of outwardly extending sections 138. As shown in FIGS. 10 and 11, outwardly extending sections 138 provide non-vertical surfaces that act as rails for support of locking mechanism 130 and for the guiding inner body member 24 within slidable body member 132.

Figures 10A, 10B:
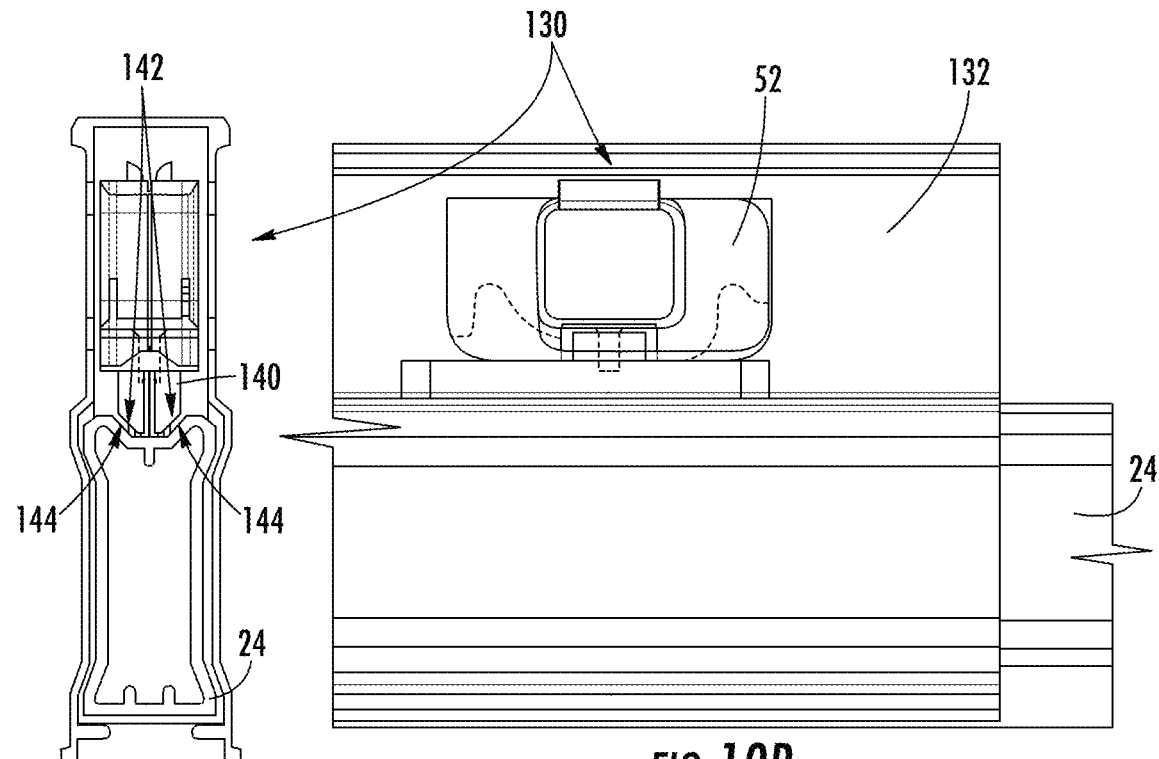
FIG. 10A is a longitudinal cross-sectional view of a level and locking mechanism in the unlocked position within the body portion of FIG. 9, according to an exemplary embodiment.
FIG. 10B is a side view of the level and locking mechanism of FIG. 10A, according to an exemplary embodiment
Figures 11A, 11B:
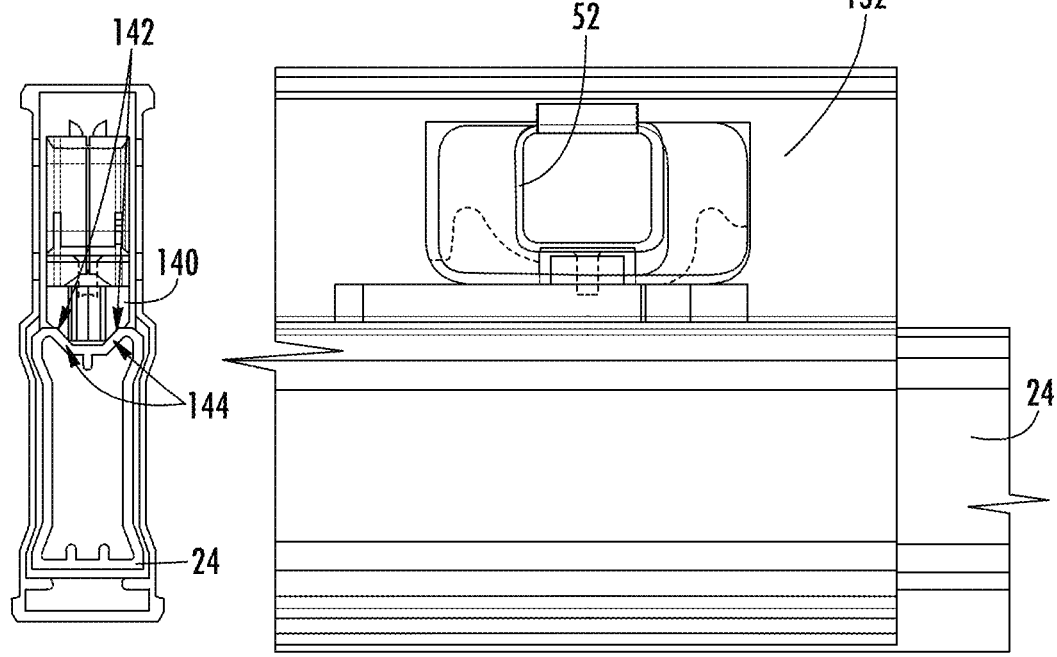
FIG. 11A is a longitudinal cross-sectional view of the level and locking mechanism of FIG. 10A in the locked position within the body portion of FIG. 9, according to an exemplary embodiment.
FIG. 11B is a side view of the level and locking mechanism of FIG. 11A, according to an exemplary embodiment

FIGS. 10A and 10B show locking mechanism 130 in the unlocked position, and FIGS. 11A and 11B show locking mechanism 130 in the locked position. In general, locking mechanism 130 includes a brake structure 140 that has angled engagement surfaces 142, and in this embodiment, inner body member 24 includes a channel structure having opposing, upwardly and laterally inwardly facing, angled surfaces 144. Locking mechanism 130 is configured such that movement of slide 52 pushes engagement surfaces 142 of brake structure 140 laterally outward and into engagement with the angled surfaces 144 of inner body member 24 when moved to the locked position. In this embodiment, the locking force applied by locking mechanism 130 is directed completely or partially in the horizontal direction coplanar with base surface 14 toward the vertical side walls of level body 132, which may decrease the likelihood that the working surfaces 14 and/or 16 of level 10 are deformed/misaligned during application of locking force.

Figure 12:
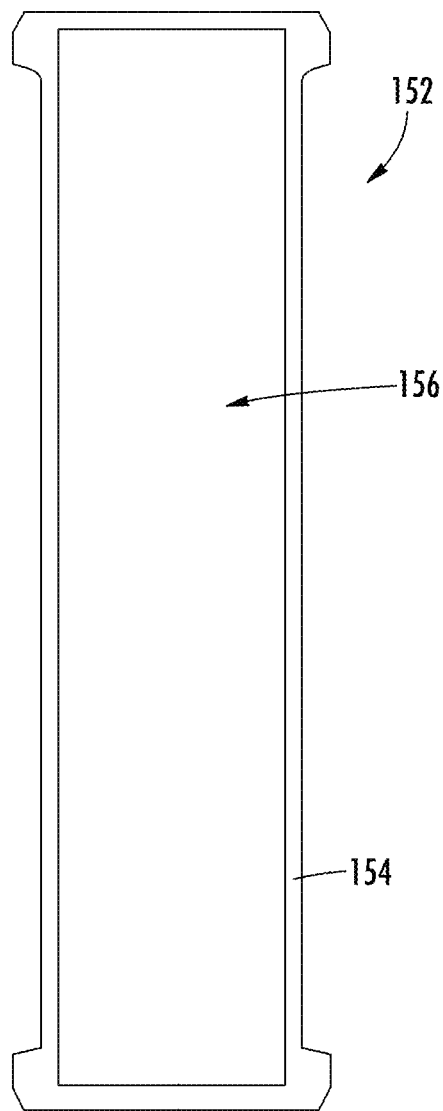
FIG. 12 is a longitudinal cross-section view of a level outer body portion, according to another exemplary embodiment.

Referring to FIGS. 12-14, a locking mechanism 150 and an associated slidable body member 152 are shown according to exemplary embodiments. Slidable body member 152 is substantially the same as slidable body member 22 discussed above, except for the differences discussed herein. Locking mechanism 150 is substantially the same as locking mechanism 50 discussed above, except for the differences discussed herein.

Slidable body member 152 is a box-type level body having a single contiguous wall structure 154 defining an internal cavity 156 that houses both inner body member 24 and locking mechanism 150. Wall structure 154 is shaped such that internal cavity 156 has a generally rectangular cross-sectional shape.

FIGS. 13A and 13B show locking mechanism 150 in the unlocked position, and FIGS. 14A and 14B show locking mechanism 150 in the locked position. In general, locking mechanism 150 includes a brake structure 160 that has angled engagement surfaces 162, and in this embodiment, inner body member 24 includes a tapered upper end having opposing, upwardly and laterally outwardly facing, angled surfaces 164. Locking mechanism 150 is configured such that movement of slide 52 pulls engagement surfaces 162 of brake structure 160 laterally inward and into engagement with the angled surfaces 164 of inner body member 24 when moved to the locked position. Similar to locking mechanism 130, the locking force applied by locking mechanism 150 is directed completely or partially in the horizontal direction, which may decrease the likelihood that the working surfaces 14 and/or 16 of level 10 are deformed/misaligned during application of locking force.

Figure 15:
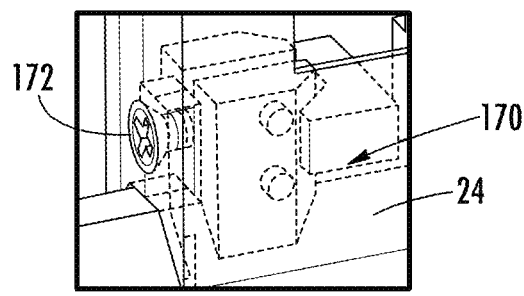
FIG. 15 is a detailed perspective view of a friction member for an extendable level, according to an exemplary embodiment.

As shown in FIG. 15, locking mechanism 150 includes an adjustable friction element 170 that is positioned adjacent to locking mechanism 150. Adjustable friction element 170 operates the same as friction element 80 discussed above. As shown, friction element 170 includes an adjustment control, shown as adjustment screw 172, that changes the amount of friction applied by friction element 112. As shown best in FIGS. 13B and 14B, adjustment screw 172 is accessible from gap 174 between body portions 22 and 20 (shown in FIG. 1) when the level is in an extended position.

In specific embodiments, the level body components (such as fixed body portion 20, slidable body portion 22 and inner body portion 24) discussed herein are each formed from a hollow piece of material, such as hollow pieces of metal material (e.g., hollow pieces of extruded aluminum). Further, it should be understood that the terms vertical and horizontal used herein refer to reference axes where horizontal is a plane that lies parallel to the working surfaces of the level and vertical is a plane that lies perpendicular to the working surfaces of the level.

Figure 16:
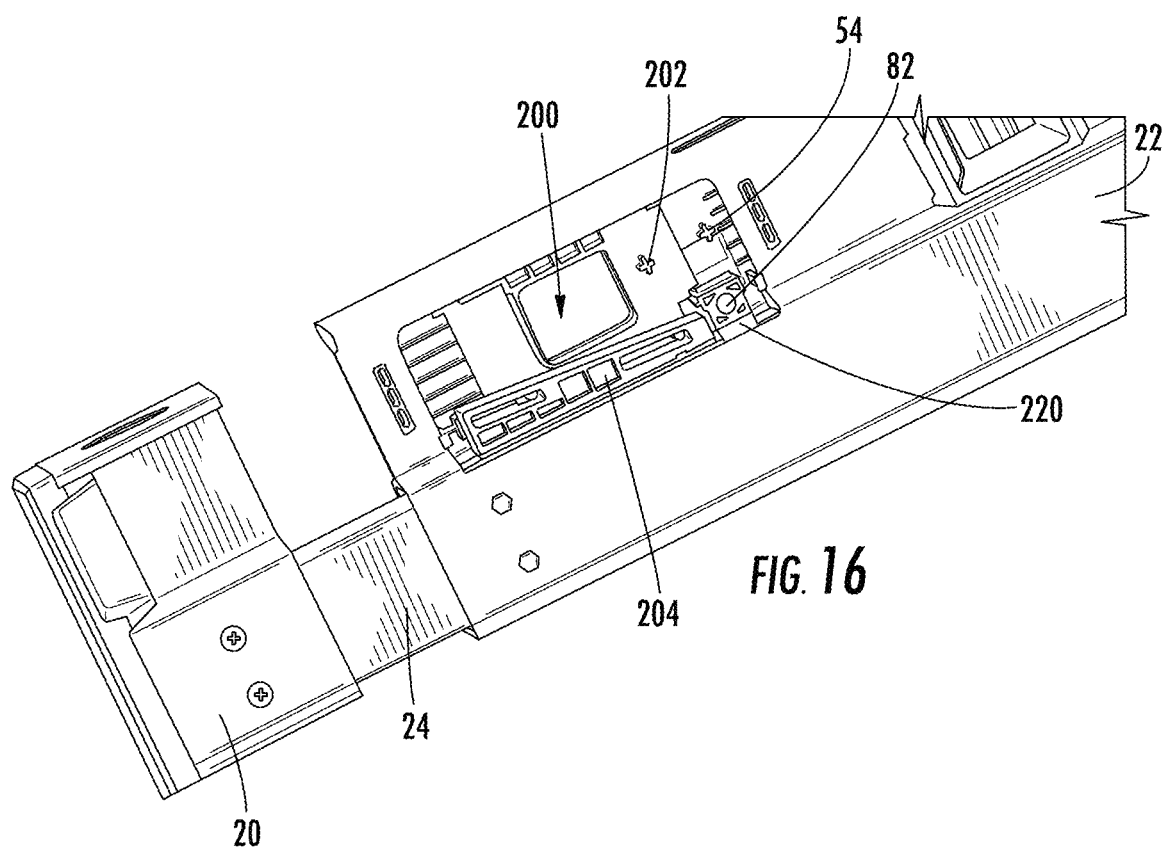
FIG. 16 is a perspective view of a locking mechanism and a friction element for an extendable level, according to another exemplary embodiment.
Figure 17:
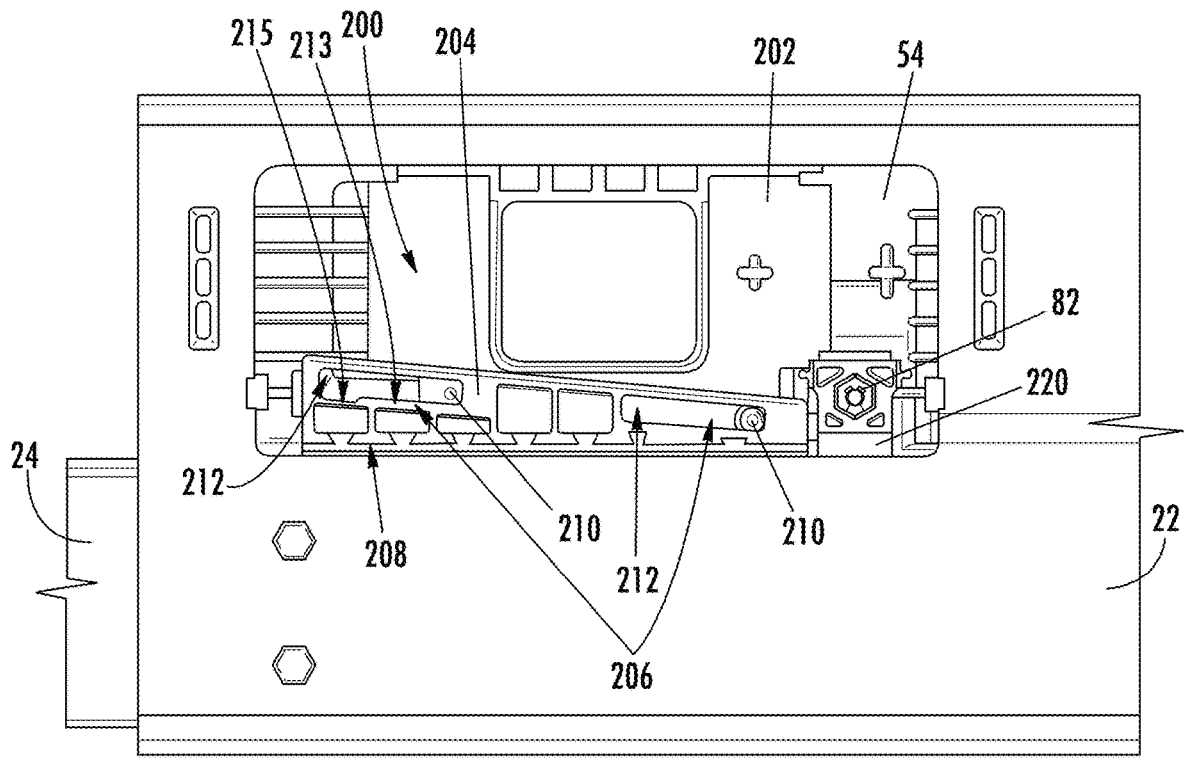
FIG. 17 is a side view of the locking mechanism of FIG. 16, according to an exemplary embodiment.
Figure 18:
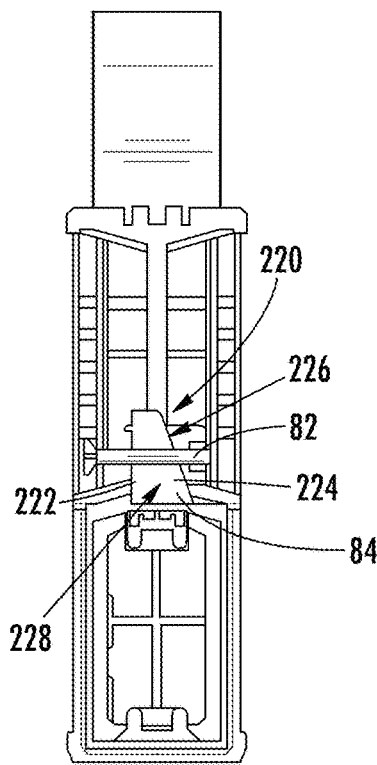
FIG. 18 is a cross-sectional view of the friction element of FIG. 16, according to an exemplary embodiment.

Referring to FIGS. 16-18, a locking mechanism 200 is shown according to an exemplary embodiment. In general, locking mechanism 200 is the same as locking mechanism 50, except for the differences discussed herein. Locking mechanism 200 includes a user actuated control, shown as slide 202, supported by locking mechanism frame 54. Locking mechanism 200 includes a brake structure 204. Brake structure 204 includes a pair of angled channels 206 and a lower engagement surface 208. Like lower engagement surface 62, lower engagement surface 208 provides frictional engagement (either directly or indirectly) to the upper surface of inner body member 24, when in the locked position. This frictional engagement holds slidable body member 22 in place relative to inner body member 24, when locking mechanism 50 is in the locked position.

Locking mechanism 200 includes angled channels 206 that are coupled to slide 202 via slide posts 210. As shown in FIG. 17, slide posts 210 extend horizontally away from the inner surface of slide 202 such that the slide posts 210 are received in the angled channels 206. Through the interaction of slide posts 210 and angled channels 206 of brake structure 204, horizontal movement of slide 202 is translated into vertical movement of brake structure 204 relative to inner body member 24. Thus, when slide 202 is moved in a first direction (e.g., translated horizontally away from fixed outer body portion 20, shown in FIG. 16), brake 204 is pulled upward away from inner body portion 24 to the unlocked position. In the unlocked position, this movement causes brake engagement surface 208 to disengage from inner body portion 24, and slidable body portion 22 is allowed to slide along inner body portion 24. When slide 202 is moved in a second direction (e.g., translated horizontally toward fixed outer body portion 20), brake 204 is pushed downward toward inner body portion 24 to the locked position. In the locked position, brake engagement surface 208 is pressed into frictional engagement with inner body portion 24 such that slidable body portion 22 is fixed in place relative to inner body portion 24.

Referring to FIG. 17, an expanded open section 212 is located at the upper end of each angled channel 206, and includes angled lower surface 213 and depression 215 within angled lower surface 213. As can be seen in FIG. 17, a maximum height of open section 212 is greater than a maximum height of channel 206. In this arrangement, open section 212 allows slide posts 210 to shift downward a small distance when brake structure 204 reaches the locked position. This movement provides a tactile and/or auditory indication of reaching the locked position as posts 210 snap into the expanded open sections 212.

In various embodiments the materials for brake structure 60 and/or brake structure 204 are selected to provide for a high friction engagement to the upper surface of inner body member 24. In particular embodiments, a lower portion of the brake structure defining the engagement surface may be made from a compressible and/or lower durometer material than the rest of the brake structure which facilitates high friction engagement with inner body member 24 upon locking.

Further referring to FIGS. 16-18, a friction element, shown as adjustable friction element 220, is shown according to an exemplary embodiment. In general, adjustable friction element 220 is the same as adjustable friction element 80, except for the differences discussed herein. Like friction element 80, friction element 220 is adjustable via an adjustment control (e.g., via a screw 82 or other mechanism) which allows the user to adjust the amount of friction applied by friction element 220, which in turn allows the user to adjust how free slidable body member 22 is to slide relative to inner body member 24.

As shown best in FIG. 18, friction element 220 includes two body portions, shown as left body portion 222 and right body portion 224. Body portions 222 and 224 have opposing and contacting vertical angled surfaces 226 and 228. In a specific embodiment, angled surfaces 226 and 228 form a 60 degree angle relative to the horizontal plane in the orientation of FIG. 18. By operation of screw 82, body portions 222 and 224 are pulled/pushed relative to each causing the lower engagement surface 84 to move vertically relative to the upper surface of inner body member 24, and this in turn adjusts the amount of the constant friction applied by friction element 220.

In specific embodiments, body portions 222 and 224 are formed from a low wear, relatively low friction and/or durable polymer material, such as a polyoxymethylene polymer material, like Delrin available from DuPont. Further to facilitate fine adjustment of the amount of friction applied by adjustable friction element 220, screw 82 may have low pitch threading such that each rotation of screw 82 translates to a small adjustment in the vertical position change of body portions 222 and 224.

Referring to FIGS. 19-22, the expanding levels discussed herein may include one or more bushing structures located between inner body member 24 and the inner surface of slidable body member 22 that defines channel 76 (see e.g. FIG. 4). In such embodiments, the bushing structures may provide for improved sliding via controlled friction and/or wear resistance as compared to an arrangement in which the outer surface of body member 24 directly engages the inner surface of slidable body member 22.

Figure 19:
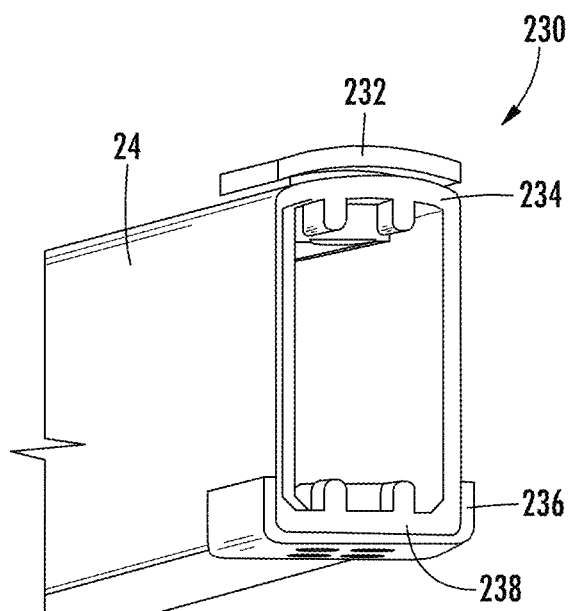
FIG. 19 is a perspective view of an inner body and a rear bushing for an extendable level, according to an exemplary embodiment.
Figure 20:
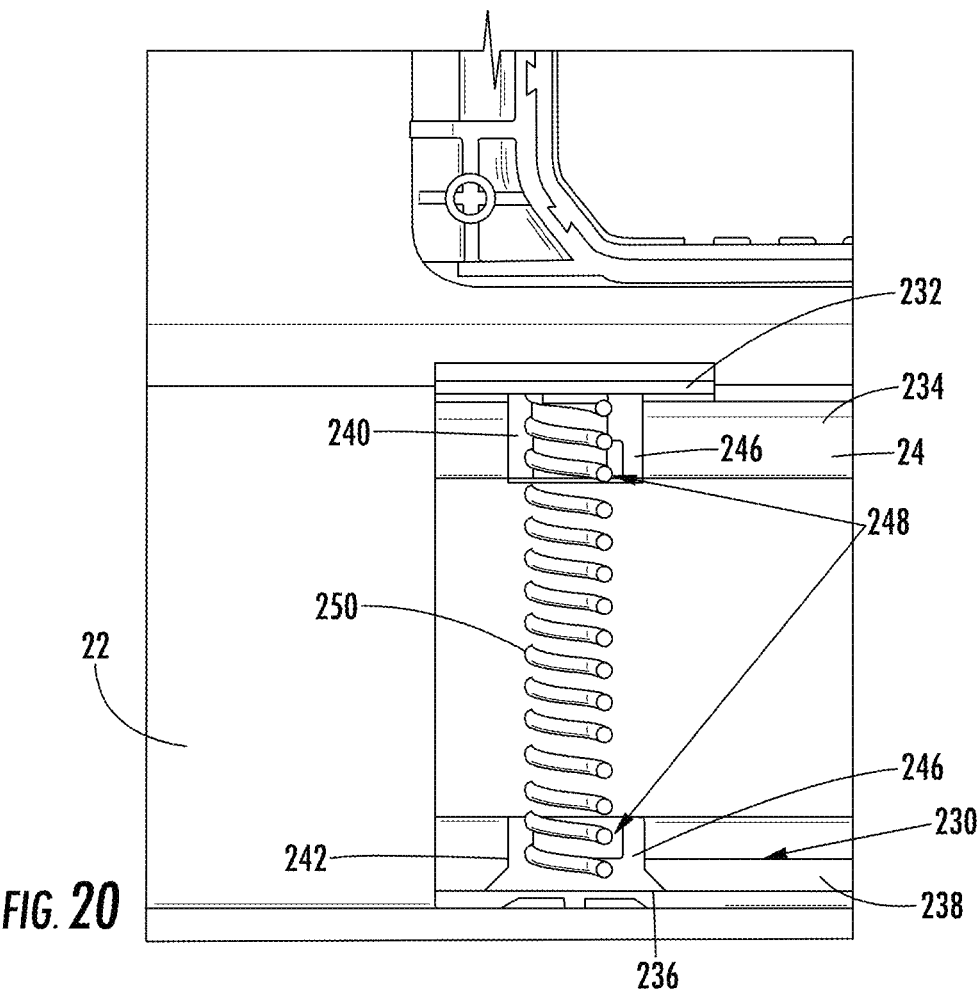
FIG. 20 is a cross-sectional view of the inner body and rear bushing of FIG. 19 located within an outer body of an extending level, according to an exemplary embodiment.
Figure 21:
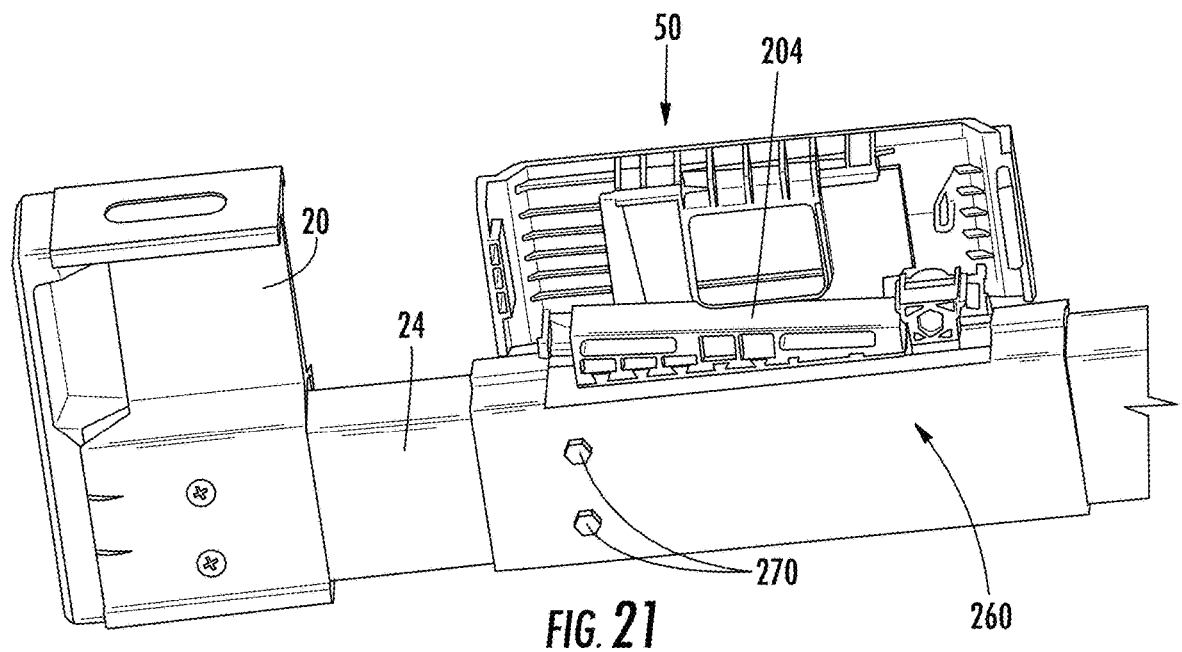
FIG. 21 is a perspective view of an inner body and a front bushing for an extendable level, according to an exemplary embodiment.
Figure 22:
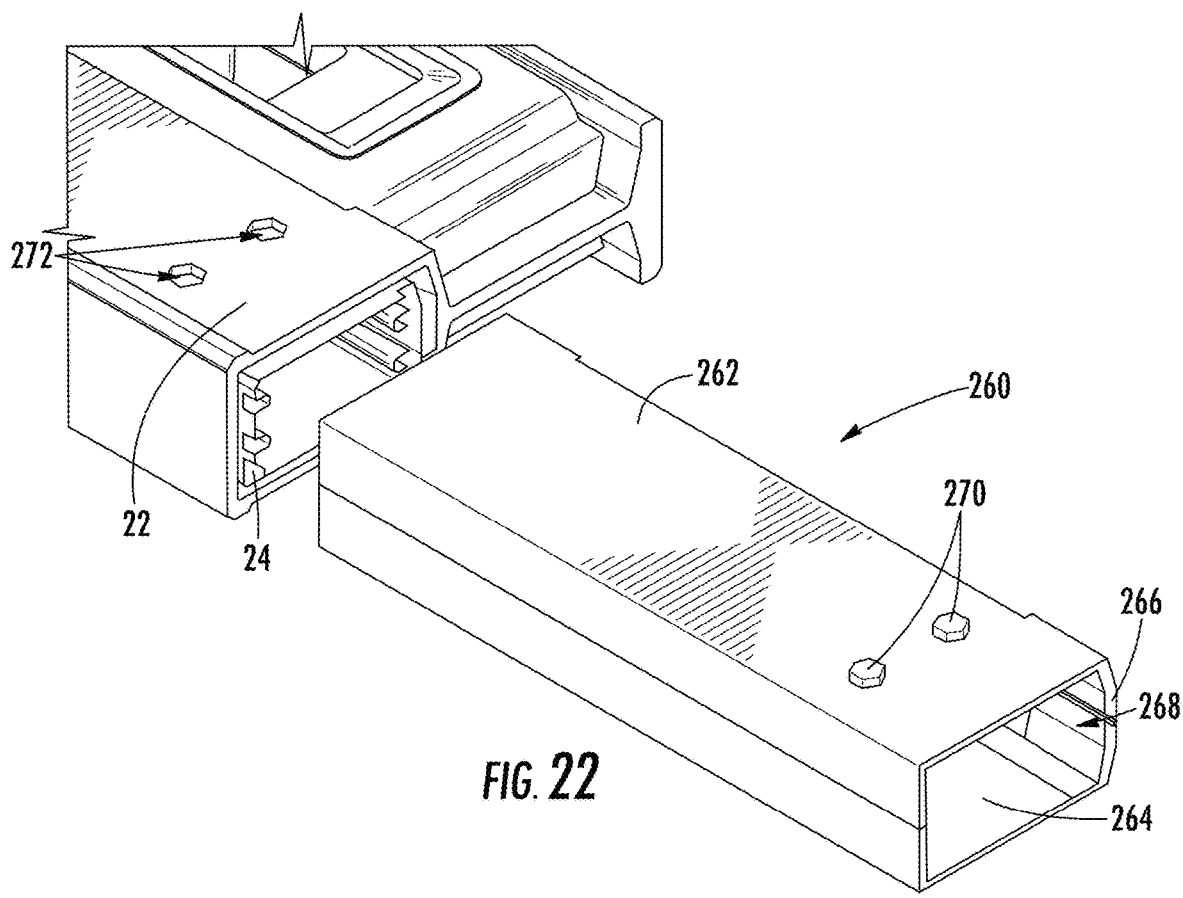
FIG. 22 is an exploded view of the front bushing of FIG. 21, according to an exemplary embodiment.

In the specific embodiments, front and rear bushing structures may be located around inner body member 24 toward each end of slidable body member 22. In particular, FIGS. 19 and 20 show a rear bushing 230 which is located near one end of inner body 24 within channel 76, adjacent end vial opening 32 and level body end 23 (see FIG. 1). Further, FIGS. 21 and 22 show a front bushing 260 which is located at the other end of inner body 24 within channel 76 adjacent/below locking mechanism 50 (see FIG. 1).

As shown in FIGS. 19 and 20, rear bushing 230 includes an upper component 232 that is located outside of an upper wall 234 of inner body member 24 and a lower component 236 that is located outside of lower wall 238 of inner body member 24. In general, components 232 and 236 are formed from a low friction, low wear polymer material providing bushing functionality between inner body member 24 and slidable body member 22.

As shown best in FIG. 20, an upper sleeve or collar 240 is coupled to and extends downward from upper bushing component 232, and a lower sleeve or collar 242 is coupled to and extends upward from lower bushing component 236. Collars 240 and 242 each include a sidewall structure, shown as cylindrical sidewalls 246 that define a cavity 248 or recess 248. As shown in FIG. 20, cylindrical sidewalls 246 extend through openings in walls 234 and 238 of inner body member 24, and a biasing element, shown as spring 250, is located between collars 240 and 242. Spring 250 applies a force between upper bushing component 232 and lower bushing component 236 to provide a high level of bushing contact to the inner surfaces of slidable body member 22.

In addition to providing a high level of bushing contact, Applicant has found that the design of rear bushing 230 provides a robust and failure resistant arrangement particularly well suited for a tool regularly used in a construction environment. In particular, the upper and lower ends of spring 250 are each received within the open central cavities 248 defined by collars 240 and 242. In this arrangement, the relatively large support contact area between spring 250 and collars 240 and 242 is less likely to fail, particularly in strain, as compared to pin-type mounting arrangements.

Further, in this arrangement, the ends of spring 250 are surrounded by and captured within collars 240 and 242, and the ends of springs 250 extend in the vertical direction through both walls 234 and 238 of inner body member 24, respectively, to engage with bushing components 232 and 236, respectively. Applicant believes that this arrangement provides a robust bushing structure (at least compared to a bushing structure in which spring 250 is received over a pin structure). In particular, even in the event of breakage or crack formation between collars 240 or 242 and the associated bushing component 232 or 236, respectively, the capture of spring 250 within the collar, the capture of the collar within the opening extending through inner body member and the biasing force of the spring 250 will tend to hold bushing 230 together and in the proper position, despite crack formation.

Referring to FIGS. 21 and 22, front bushing 260 is shown in detail. As shown best in FIG. 21, front bushing 260 is coupled to slidable body member 22 and around inner body member 24 below locking mechanism 50. In general, front bushing 260 includes a low friction, low wear polymer material providing bushing functionality between inner body member 24 and slidable body member 22, facilitating sliding of inner body member 24 relative to slidable body member 22.

In various embodiments, front bushing 260 is formed from two separate pieces shown as first segment 262 and second segment 264. Upper portions of first segment 262 and second segment 264 meet at an angled interface 266 defining a gap 268. This angled interface 266 and gap 268 allow for flexion/compression during assembly, which allows front bushing 260 to be inserted into slidable body member 22, and the resilience of the bushing material and/or outward bias of front bushing 260 provides for a high level of contact between the outer surfaces of front bushing 260 and the inner surface of slidable body member 22 that defines channel 76.

Front bushing 260 includes one or more posts, shown as hex pegs 270. In this embodiment, hex pegs 270 are received through openings 272 formed through the sidewall of slidable body member 22. In this manner, front bushing 260 is fixed in place relative to slidable body member 22, and inner body member 24 to slide relative to front bushing 260 during extension and retraction of the expanding level.

Figure 23:
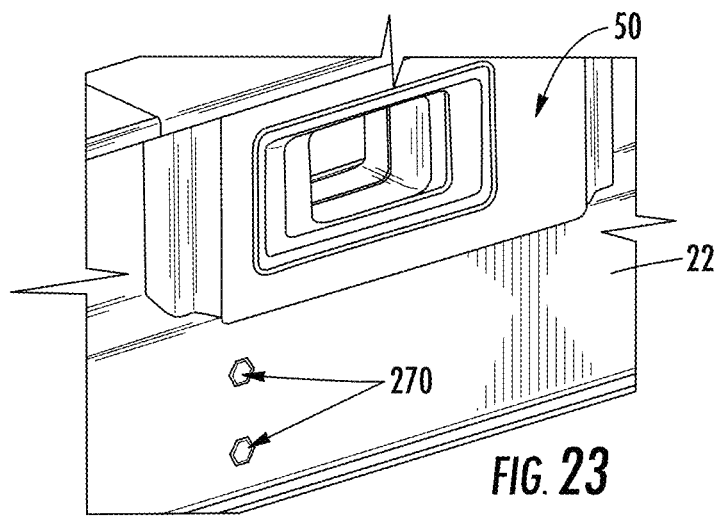
FIG. 23 is a perspective view of an outer body of an extendable level including a front bushing, according to another exemplary embodiment.
Figure 24:
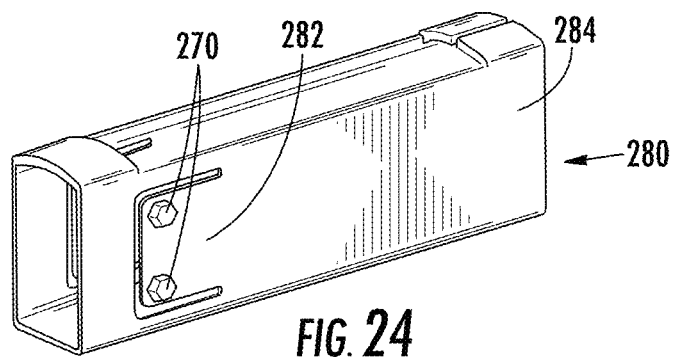
FIG. 24 is a perspective view of the front bushing of FIG. 23, according to an exemplary embodiment.

Referring to FIGS. 23 and 24, a front bushing 280 is shown according to an exemplary embodiment. Front bushing 280 is substantially the same as front bushing 260 except for the differences discussed herein. Front bushing 280 includes a flexible and outwardly biased arm 282 formed in each sidewall 284 of front bushing 280. Hex pegs 270 are located on arms 282, and the outward bias of arms 282 facilitate the snap fitting and retention of front bushing 280 in outer body member 22. In addition, this outward bias also acts to securely retain hex pegs 270 engaged within openings 272.

Figure 25:
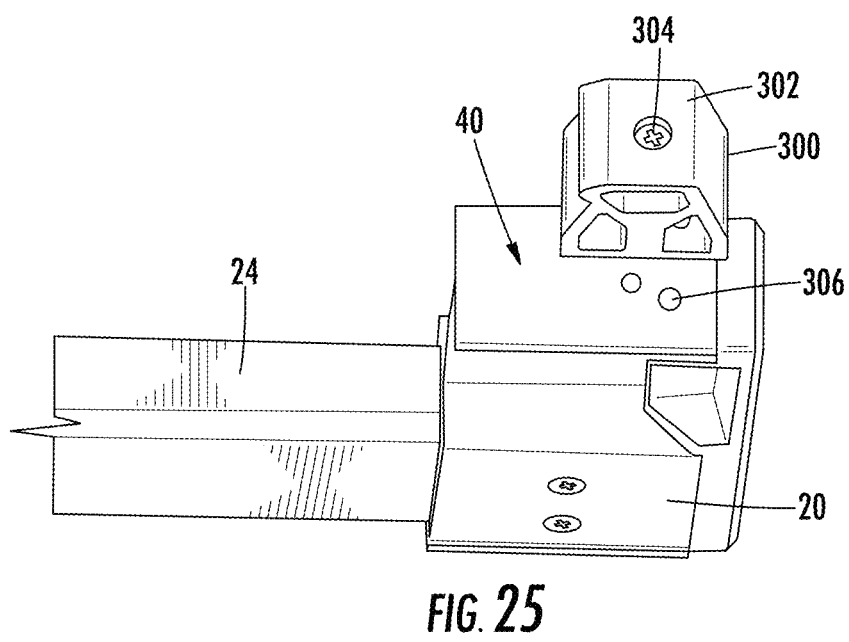
FIG. 25 is a perspective view of a standoff for an extendable level, according to an exemplary embodiment.

Referring to FIGS. 25-27, in various embodiments, level 10 may include a pair of standoffs 300 that can be removably attached at opposing ends of level body 12. In general, standoffs 300 define a pair of aligned and height-extended leveling surfaces 302. In use, standoffs 300 can be mounted to level body 12 in order to use level 10 to level two surfaces that have an obstruction located in between.

To mount standoffs 300 to level body 12, fastener 304 is mounted and retained within standoff 300. In the embodiment shown in FIG. 25, fastener 304 is a threaded fastener that is threaded into an opposing threaded opening located in level body 12. As shown in FIG. 25, fastener 304 is retained within standoff 300 (e.g., via a lip that captures fastener within standoff 300) such that fastener 304 does not separate from standoff 300, when standoff 300 is disconnected from level 10. In some embodiments, level body 12 may include one or more alignment pins 306 that facilitate alignment of fastener 304 with the receiving hole within the level body. As can be seen best in FIG. 27, level 10 does not include an additional, projecting standoff mounting structure along upper surface 40, such that surface 40 remains level following removal of standoff 300.

In addition, standoff 300 includes a projection or hook 310. In general hook 310 provides a structure that grips an edge or corner of a workpiece, allowing the user to pull and extend level 10 while the end, with the standoff, is held in place via engagement of the workpiece by the hook 310. As shown best in FIGS. 26 and 27, hook 310 is a projection that extends outward away from surface 302 and in a direction toward slidable body member 22. In this manner the upper half of standoff 300 is asymmetrical about a vertical axis as shown in FIGS. 26 and 27. Further, hook 310 defines a width dimension that is greater than the width dimension of surface 302 but is also less than the width dimension at the lower end of standoff 300.

Figure 28:
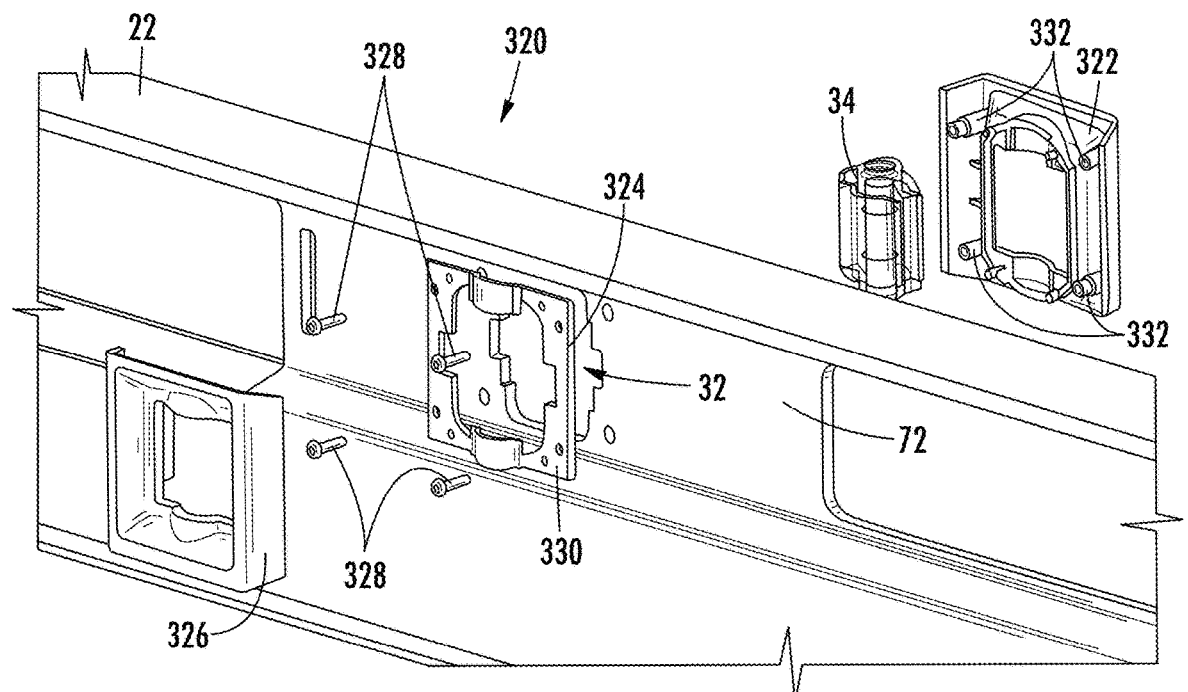
FIG. 28 is an exploded perspective view of a level vial assembly for an extendable level, according to an exemplary embodiment.

Referring to FIG. 28, a vial assembly 320 for holding/positioning a level vial 34 within wall 72 is shown according to an exemplary embodiment. In general, vial assembly 320 includes a rear frame 322, a front frame 324, a front face plate 326 and a plurality of fasteners, shown as screws 328. In general, vial opening 32 is located within wall 72, and level vial 34 is located within vial opening 32. Rear frame 322 is positioned to surround both vial opening 32 and level vial 34 along the rear face of wall 72, and front frame 324 is positioned to surround both vial opening 32 and level vial 34 along the front face of wall 72. In this arrangement, inward facing surfaces of rear frame 322 and of front frame 324 engage level vial 34 trapping level vial 34 within vial opening 32.

Vial assembly 320 includes screws 328. Screws 328 pass through screw holes 330 in front frame 324 and are received within threaded screw channels 332 within rear frame 322. As screws 328 are tightened, level vial 34 is clamped between rear frame 322 and front frame 324 which fixes level vial 34 in place relative to wall 72. In conventional assemblies in which a level vial is mounted within a vertical wall or web in a typical I-beam-style level frame, glue or adhesive is typically used to fix the level vial and associated frame components in place. However, Applicant has found that such vial assemblies are susceptible to being pushed out of the vial opening due to relative weakness of such adhesives. In contrast, the mechanical, clamping force type mounting provided by screws 328 and frames 322 and 324 eliminate/reduce the risk of vial 34 being pushed from vial opening 32.

Vial assembly 320 includes front face plate 326 that is mounted over front frame 324 and over screws 328. Front face plate 326 provides a face that is uninterrupted by screw heads, screw holes or other fasteners. In specific embodiments, front face plate 326 is glued in place over front frame 324.

Figure 29:
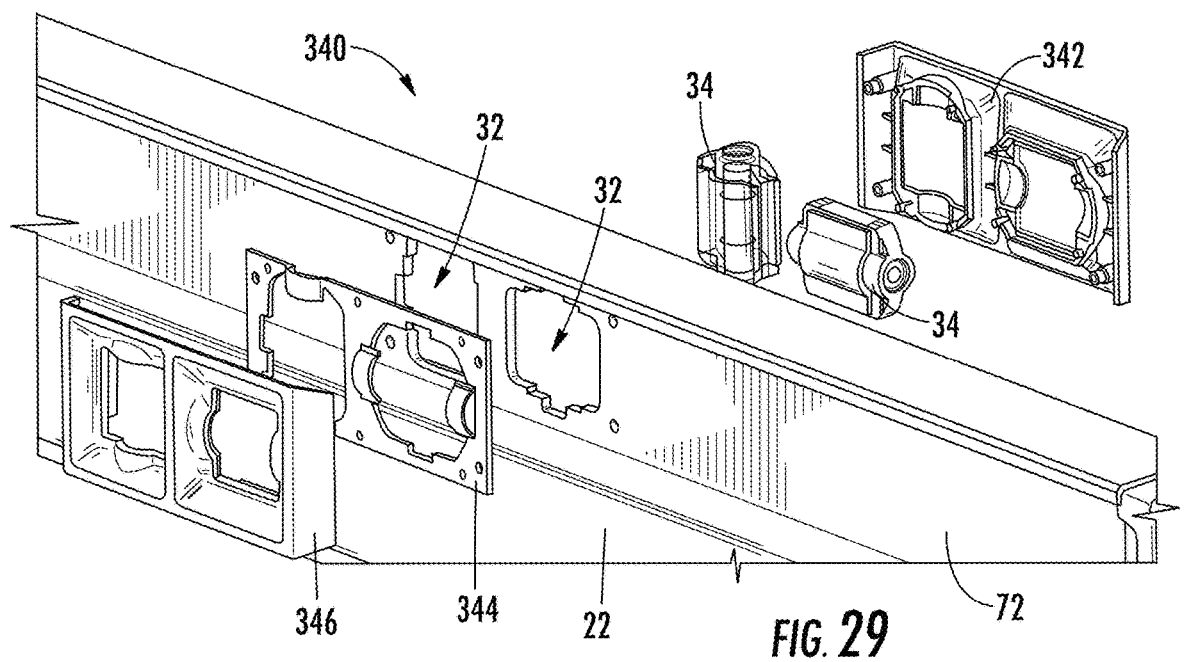
FIG. 29 is an exploded perspective view of a double level vial assembly for an extendable level, according to an exemplary embodiment.

Referring to FIG. 29, in some embodiments, level 10 may include a double vial assembly 340 located near one of the ends of level body 12. As shown in FIG. 29, double vial assembly is located adjacent to end 23, located at the end of level 10 opposite fixed body portion 20. In general, double vial assembly 340 includes a pair of level vials 34, one oriented horizontally and one oriented vertically, that are received within a pair of adjacent vial openings 32. Locating the pair of vials 34, adjacent end 23 allows the user to easily view level vials oriented in both vertical and horizontal directions, particularly when level 10 is in the extended position.

Like vial assembly 320, double vial assembly 340 includes a rear frame 342, a front frame 344 and a front face plate 346. Double vial assembly 340 is assembled like assembly 320 except that it supports two level vials 34 instead of one.

It should be understood that the figures illustrate the exemplary embodiments in detail, and it should be understood that the present application is not limited to the details or methodology set forth in the description or illustrated in the figures. It should also be understood that the terminology is for the purpose of description only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein the article "a" is intended to include one or more components or elements, and is not intended to be construed as meaning only one.

Various embodiments of the invention relate to any combination of any of the features, and any such combination of features may be claimed in this or future applications. Any of the features, elements, or components of any of the exemplary embodiments discussed above may be utilized alone or in combination with any of the features, elements, or components of any of the other embodiments discussed above.

In various exemplary embodiments, the relative dimensions, including angles, lengths and radii, as shown in the Figures are to scale. Actual measurements of the Figures will disclose relative dimensions, angles and proportions of the various exemplary embodiments. Various exemplary embodiments extend to various ranges around the absolute and relative dimensions, angles and proportions that may be determined from the Figures. Various exemplary embodiments include any combination of one or more relative dimensions or angles that may be determined from the Figures. Further, actual dimensions not expressly set out in this description can be determined by using the ratios of dimensions measured in the Figures in combination with the express dimensions set out in this description. In addition, in various embodiments, the present disclosure extends to a variety of ranges (e.g., plus or minus 30%, 20%, or 10%) around any of the absolute or relative dimensions disclosed herein or determinable from the Figures.

What is claimed is:

1. A level comprising:
   an inner body member that extends along a longitudinal axis;
   a first body portion coupled to the inner body member, the first body portion comprising:
     a first planar base surface; and
     a first top surface opposing the base surface;
   a second body portion slidably coupled to the inner body member, the second body portion comprising:
     a second planar base surface coplanar with the first planar base surface, the first and second base surfaces collectively defining a working base surface; and
     a second top surface coplanar with the first top surface, the first and second top surfaces collectively defining a working top surface;
   a level sensing device; and
   a locking mechanism coupled to the second body portion, the locking mechanism comprising a user actuated control, wherein the user actuated control is configured such that translational movement of the user actuated control moves the locking mechanism between a locked position and an unlocked position;
   wherein relative positions of the first body portion and the second body portion define a fully retracted position and a fully extended position, the fully retracted position defining a shortest working length of the level along the longitudinal axis and the fully extended position defining a longest working length of the level along the longitudinal axis.

2. The level of claim 1, wherein the user actuated control is a slide that translates in a direction of the longitudinal axis, the locking mechanism comprising a brake structure that interfaces with the slide such that movement of the slide moves the brake structure toward the inner body member, the brake structure comprising an engagement surface that interfaces with a surface of the inner body member.

3. The level of claim 2, the braking structure comprising a ramp structure that is coupled to the slide, wherein:
   when the slide is moved in a first direction along the longitudinal axis, the braking structure is pulled away from the surface of the inner body member; and
   when the slide is moved in a second direction opposite the first direction, the braking structure is pushed into frictional engagement with the surface of the inner body member.

4. The level of claim 3, the engagement surface of the braking structure defines a length parallel to the longitudinal axis between 30 mm and 300 mm.

5. The level of claim 3, wherein a ratio between a length of the engagement surface of the braking structure and the level's shortest working length is between 1:15 and 1:30.

6. The level of claim 3, the engagement surface of the braking structure defines an area between 500 $mm^2$ and 3000 $mm^2$.

7. The level of claim 1, the second body member comprising:
   a central wall;
   an upper wall that defines to the second top surface, the upper wall coupled to an upper end of the central wall; and
   a box structure coupled to a lower end of the central wall and defining a channel that receives the inner body member.

8. The level of claim 7, the central wall defining an opening, wherein the user actuated control of the locking mechanism is coupled to the central wall and located within the opening.

9. The level of claim 8, wherein the user actuated control is a slide that actuates along the longitudinal axis, the slide being disposed at least partially within the opening.

10. The level of claim 9, wherein the locking mechanism comprises a braking structure that interfaces with the slide, the braking structure comprising an engagement surface that interfaces against a surface of the inner body member.

11. The level of claim 1, further comprising a friction element that resists sliding of the second body member relative to the inner body member.

12. The level of claim 11, wherein the friction element is adjustable such that an amount of friction applied by the friction element to a surface of the inner body member is adjustable.

13. The level of claim 12, wherein the friction element is supported by the second body member.

14. The level of claim 1, the locking mechanism comprising:
   a brake that defines a channel, the channel comprising an angled lower surface and a depression within the angled lower surface; and
   a slide that slides along the longitudinal axis, the slide comprising a post protruding from the slide and received within the channel, wherein the depression receives the post when the locking mechanism is in a locked position.

15. The level of claim 1, the level further comprising:
   a first standoff member that is removably attached to the first body portion; and
   a second standoff member that is removably attached to the second body portion, wherein the first and second standoff members are configured to permit the level to measure the orientation of two workpiece surfaces that have an obstruction located between them.

16. A level comprising:

a fixed body member comprising:

a first planar base surface; and a first top surface opposing the base surface;

an extended body member that extends along a longitudinal axis, wherein the fixed body member is coupled to a first end of the extended body member;

a slidable body member slidably coupled to a second end of the extended body member, the slidable body member comprising:

a second planar base surface coplanar with the first planar base surface, the first and second base surfaces collectively defining a working base surface;

a second top surface coplanar with the first top surface, the first and second top surfaces collectively defining a working top surface;

an orientation measuring component; and a locking mechanism coupled to the slidable body member, the locking mechanism comprising a user actuated control, wherein the user actuated control is configured such that movement of the user actuated control moves the locking mechanism between a locked position and an unlocked position;

wherein relative positions of the fixed body member and the slidable body member define a fully retracted position and a fully extended position, the fully retracted position comprising a shortest working length of the level along the longitudinal axis and the fully extended position comprising a longest working length of the level along the longitudinal axis;

wherein the user actuated control of the locking mechanism is accessible to a user when the level is in the fully retracted position.

17. The level of claim 16, wherein the user actuated control is a slide that translates in a direction along the longitudinal axis, the locking mechanism comprising a brake structure that interfaces with the slide, the brake structure comprising an engagement surface that interfaces with a surface of the extended body member.

18. The level of claim 16, wherein the user actuated control of the locking mechanism is located between the second planar base surface and the second top surface of the slidable body member.

19. The level of claim 16, the slidable body member comprising:

a central wall that extends along the longitudinal axis;

an upper wall that defines the second top surface coupled to an upper end of the central wall; and a box structure coupled to a lower end of the central wall and defining a channel that receives the extended body member;

wherein the central wall defines an opening, wherein the user actuated control of the locking mechanism is coupled to the central wall and located within the opening.

20. A level comprising:

an inner body member that extends along a longitudinal axis;

a first body portion coupled to the inner body member, the first body portion comprising:

a first planar base surface;

a first top surface opposing the base surface;

a second body portion slidably coupled to the inner body member, the second body portion comprising:

a second planar base surface coplanar with the first planar base surface, the first and second base surfaces collectively defining a working base surface;

a second top surface coplanar with the first top surface, the first and second top surfaces collectively defining a working top surface;

a central wall;

an upper wall that defines to the second top surface coupled to an upper end of the central wall; and a box structure coupled to a lower end of the central wall and defining a channel that receives the inner body member;

a level sensing device supported by the second body member; and a locking mechanism comprising a user actuated control, wherein the user actuated control is coupled to the central wall of the second body member, wherein the user actuated control is configured such that movement of the user actuated control moves the locking mechanism between a locked position and an unlocked position;

wherein relative positions of the first body portion and the second body portion define a fully retracted position and a fully extended position, the fully retracted position comprising a shortest working length of the level along the longitudinal axis and the fully extended position comprising a longest working length of the level along the longitudinal axis.

* * * * *